(12) United States Patent
Kanaya et al.

(10) Patent No.: US 12,383,825 B2
(45) Date of Patent: *Aug. 12, 2025

(54) APPARATUS AND METHOD FOR STREAMING VIDEO DATA TO VIEWING TERMINALS

(71) Applicant: GREE, Inc., Tokyo (JP)

(72) Inventors: Yosuke Kanaya, Tokyo (JP); Kaoru Murakami, Tokyo (JP)

(73) Assignee: GREE Holdings, Inc., Tokyo (JP)

( * ) Notice: Subject to any disclaimer, the term of this patent is extended or adjusted under 35 U.S.C. 154(b) by 112 days.

This patent is subject to a terminal disclaimer.

(21) Appl. No.: 18/209,476

(22) Filed: Jun. 14, 2023

(65) Prior Publication Data

US 2023/0321531 A1    Oct. 12, 2023

Related U.S. Application Data

(63) Continuation of application No. 17/363,016, filed on Jun. 30, 2021, now Pat. No. 11,707,673.

(30) Foreign Application Priority Data

Jun. 30, 2020 (JP) ................................ 2020-112715

(51) Int. Cl.
   *A63F 13/00* (2014.01)
   *A63F 13/355* (2014.01)
   (Continued)

(52) U.S. Cl.
   CPC ............ *A63F 13/355* (2014.09); *A63F 13/44* (2014.09); *A63F 13/45* (2014.09); *A63F 13/69* (2014.09);
   (Continued)

(58) Field of Classification Search
   CPC ............................... A63F 13/86; A63F 13/335
   See application file for complete search history.

(56) References Cited

U.S. PATENT DOCUMENTS 6,493,001 B1    12/2002 Takagi et al.
8,944,911 B2    2/2015  Avent et al.
(Continued)

FOREIGN PATENT DOCUMENTS

JP    2019-071960 A    5/2019
JP    2020-017146 A    1/2020

OTHER PUBLICATIONS

Office Action issued on Sep. 5, 2023, in corresponding Japanese patent Application No. 2022-055343, 11 pages.
(Continued)

*Primary Examiner* — David L Lewis
*Assistant Examiner* — Eric M Thomas
(74) *Attorney, Agent, or Firm* — XSENSUS LLP

(57) ABSTRACT

A terminal comprises processing circuitry configured to control a display to display a character video including a first character object representing a stream user; transmit character information to a plurality of viewing user terminals to display the character video to a plurality of viewing users different from the stream user; control the display to display a screen for a game played by the stream user; transmit game information to the plurality of viewing user terminals to display the game video to the plurality of viewing users; and produce a game effect according to instructions for the stream user from a viewing user terminal of one viewing user of the plurality of viewing users. Display of the screen includes displaying at least one of a screen for a first game and a screen for a second game as the screen for the game according to a progress of the game.

16 Claims, 19 Drawing Sheets

(51) Int. Cl.

| | |
|---|---|
| *A63F 13/44* | (2014.01) |
| *A63F 13/45* | (2014.01) |
| *A63F 13/69* | (2014.01) |
| *A63F 13/86* | (2014.01) |
| *A63F 13/87* | (2014.01) |
| *A63F 13/92* | (2014.01) |

(52) U.S. Cl.
CPC .............. *A63F 13/86* (2014.09); *A63F 13/87* (2014.09); *A63F 13/92* (2014.09); *A63F 2300/572* (2013.01)

(56) References Cited

U.S. PATENT DOCUMENTS

| | | | |
|---|---|---|---|
| 9,789,403 | B1 | 10/2017 | Furment et al. |
| 10,924,566 | B2 | 2/2021 | Rosedale |
| 2003/0038805 | A1* | 2/2003 | Wong .................. A63F 13/5252 345/473 |
| 2009/0202114 | A1 | 8/2009 | Morin et al. |
| 2012/0028700 | A1 | 2/2012 | Avent et al. |
| 2015/0224399 | A1 | 8/2015 | Melo |
| 2017/0003784 | A1* | 1/2017 | Garg ...................... A63F 13/87 |
| 2017/0006074 | A1* | 1/2017 | Oates, III ........... H04N 21/2353 |
| 2017/0038916 | A1 | 2/2017 | Beach et al. |
| 2017/0106277 | A1 | 4/2017 | Perdigon Rodriguez et al. |
| 2018/0028916 | A1 | 2/2018 | Chen et al. |
| 2018/0091732 | A1 | 3/2018 | Wilson et al. |
| 2018/0104573 | A1 | 4/2018 | Jeffery et al. |
| 2018/0165700 | A1 | 6/2018 | Onda et al. |
| 2018/0350144 | A1 | 12/2018 | Rathod |
| 2019/0221022 | A1 | 7/2019 | Kato et al. |
| 2019/0266807 | A1 | 8/2019 | Lee et al. |
| 2020/0023280 | A1 | 1/2020 | Onda et al. |
| 2020/0234481 | A1 | 7/2020 | Scapel et al. |
| 2021/0192816 | A1 | 6/2021 | Watanabe et al. |

OTHER PUBLICATIONS

"The gift function has started!", Tumblr, Dec. 14, 2018, total 7 pages. Internet <URL: http://web.archive.org/web/20181214025043/> [Search date Aug. 31, 2023].

"Will Genvid's next-generation game live streaming system allow viewers to interfere with the game being played?", 4Gamer.net, Apr. 4, 2019, total 9 pages. Internet <URL: https://www.4gamer.net/games/999/G999905/20190402096/> [Search date Aug. 31, 2023].

US Office Action issued Dec. 21, 2023 in U.S. Appl. No. 16/883,377, 28pp.

U.S. Final Office Action issued Feb. 17, 2023 in co-pending U.S. Appl. No. 16/883,377.

"The gift function will start!" [Online], Dec. 14, 2018, https://web.archive.org/web/20181214020504/https:/mirrativtmbr.tumblr.com/post/179074342628/%E3% 82% Ae% E3% 83% 95% E3% 83% 88% E6% A9% 9F% E8% 83% BO% E3% 82% 92% E9% 96% 8B% ES% A7% 8B% E3% 81 % 97% E3% 81 % BE% E3% 81% 99, especially In the text and figures.

Japanese Office Action issued Dec. 7, 2021 in Japanese Application No. 2020-112715.

U.S. Office Action issued Nov. 24, 2021 in U.S. Appl. No. 16/883,377.
U.S. Office Action issued Aug. 15, 2022 in U.S. Appl. No. 16/883,377, 29 pages.

* cited by examiner

APPARATUS AND METHOD FOR STREAMING VIDEO DATA TO VIEWING TERMINALS

CROSS-REFERENCE TO RELATED APPLICATIONS

The present application is a continuation of U.S. application Ser. No. 17/363,016, filed on Jun. 30, 2021, which claims priority to JP 2020-112715, filed in Japan on Jun. 30, 2020, and the entire contents of each are incorporated by reference in their entirety.

TECHNICAL FIELD

The embodiment disclosed herein relates to a non-transitory computer readable medium storing a control program for a terminal, a control method for a terminal, a terminal, a control method for a server apparatus, a method performed by one or more processors, and a stream system.

BACKGROUND

Conventional video stream systems may stream data including video data to one or more terminals. The conventional video stream systems use techniques that allow a viewer, who views a stream screen based on the stream data, to operate a terminal so that predetermined objects, comments, and the like are provided to a streamer of the video data. For instance, a video stream system streams to one or more terminals the stream data in which video data from a streamer and image data showing an item provided by a viewer are displayed at the same time. In this video stream system, each viewer can view image data showing items provided by the viewer and/or items provided by other viewers along with the video data from the streamer.

SUMMARY

In an exemplary implementation of the present application, a terminal comprises processing circuitry configured to control a display to display a character video including a first character object representing a stream user; transmit character information to a plurality of viewing user terminals to display the character video to a plurality of viewing users different from the stream user; control the display to display a screen for a game played by the stream user; transmit game information to the plurality of viewing user terminals to display the game video to the plurality of viewing users; and produce a game effect according to instructions for the stream user from a viewing user terminal of one viewing user of the plurality of viewing users. Display of the screen includes displaying at least one of a screen for a first game and a screen for a second game as the screen for the game according to a progress of the game. To produce the game effect, the processing circuitry determines whether the game effect to be produced is a game effect on the first game, and in a case that the determining indicates that the game effect to be produced is not a game effect on the first game, produces a game effect different from the game effect on the first game.

DETAILED DESCRIPTION OF THE DRAWINGS

Figure 1A:
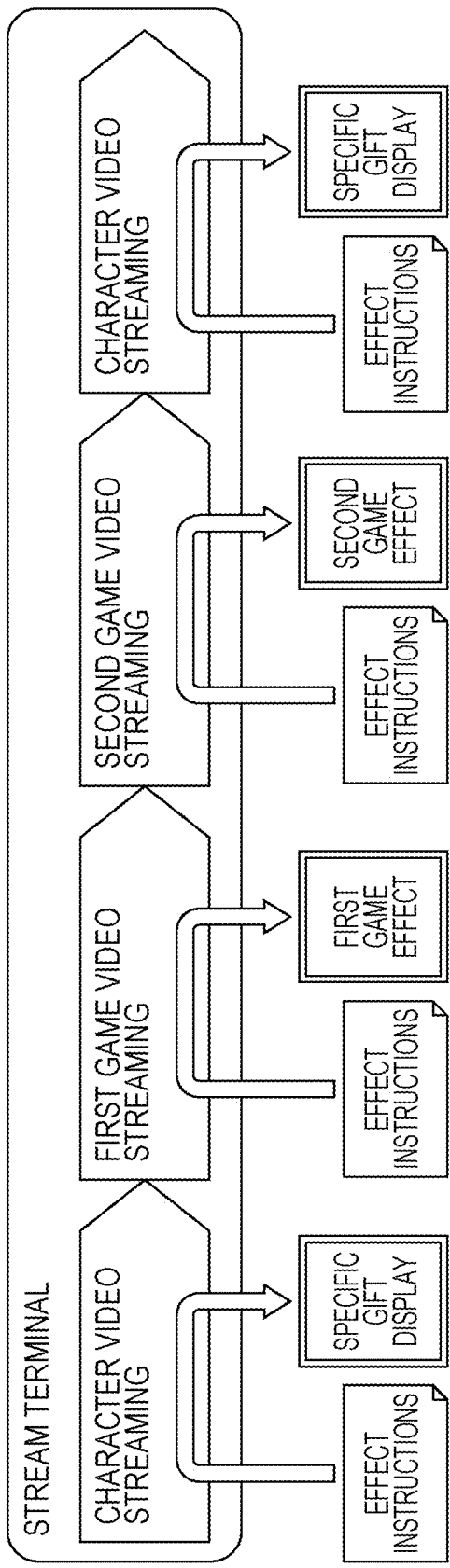
FIGS. 1A and 1B are schematic diagrams for illustrating an example of an overview of a video stream system.

In a video stream system in related art, various types of data are used, such as video data of a character object representing the streamer and video data in which a gameplay is captured, as the stream data provided by the streamer. When instructions to display an object such as an item along with a video based on stream data are input to a terminal by a viewer, a display object corresponding to the input instructions is similarly displayed regardless of the type of the stream data being streamed.

However, even during streaming of video data of a gameplay of a streamer, it has been difficult to give each viewer the feeling of joining in or cooperating with the gameplay of the streamer just by providing the same display objects as in the video data of character objects. Similarly, it has been not possible to provide various interactions with the stream event of a streamer, suitable for the type of the stream data just by generating the same event effect (such as use of a virtual or real monetary value, and a game effect on the game being played) in the video data of the gameplay of the streamer and the video data of characters.

Also, in the video stream system in related art, when display objects and event effects of different types are prepared for respective pieces of stream data as the display objects and event effects which can be provided by a viewer, user interface on the viewer side may become complicated, and it may be difficult for the viewer to interact with a stream event immediately. The inventors of the present disclosure have developed technology to address these issues.

In an exemplary implementation of the present application, a non-transitory computer readable medium storing a control program for a terminal, control method for a terminal, terminal, control method for a server apparatus, method performed by one or more processors, and stream system have been devised to cope with such problems, and make it possible to improve the game performance related to a streamed game video and/or the sense of togetherness between users for a stream event without making the user interface complicated.

The non-transitory computer readable medium stores a control program for a terminal including one or a plurality of processors, and the control program causes the one or plurality of processors to execute a process including: displaying a character video including a first character object representing a stream user and transmitting information to display the character video to a terminal of at least one viewing user different from the stream user; displaying a screen for a game played by the stream user and transmitting information to display a game video including the screen for the game to the terminal of the at least one viewing user; and producing a game effect according to instructions for the stream user from a terminal of one of the at least one viewing user. At least one of a screen for a first game and a screen for a second game is displayed as a screen for the game according to progress of the game, and in the producing of the game effect, it is determined whether the game effect to be produced is a game effect on the first game, and upon determination that the game effect to be produced is not a game effect on the first game, a game effect different from the game effect on the first game is produced.

In addition, in the non-transitory computer readable medium, it is preferable that a gift object according to instructions for a stream user from a terminal of one of at least one viewing user be displayed during display of a character video.

In addition, in the non-transitory computer readable medium, preferably, the control program further causes the one or plurality processors to upon end of the game, end display of the screen for the game and start display of the character video, and upon start of the display of the character video, display a gift object according to each of the instructions given during execution of the game.

In addition, in the non-transitory computer readable medium, preferably, in the screen for the first game, a first character image showing the first character object is displayed, and in the screen for the second game, the first character image is not displayed.

In addition, in the non-transitory computer readable medium, preferably, a second character image showing a second character object is displayed in the screen for the first game and the screen for the second game, the second character object representing a viewing user who has given the instructions.

In addition, in the non-transitory computer readable medium, preferably, the second game starts in response to an end of execution of the first game, and the game effect on the first game is an effect of reducing an execution time of the first game.

In addition, in the non-transitory computer readable medium, preferably, an image showing a predetermined game medium is displayed on the screen for the second game, the predetermined game medium is automatically selected from a plurality of game media according to progress of the first game, and the game effect on the first game is an effect of increasing a selection probability of a specific type of a game medium.

In addition, in the non-transitory computer readable medium, preferably, the predetermined game medium shown by the image displayed on the screen for the second game is associated with points, and a game effect on the second game is an effect of changing the points.

In addition, in the non-transitory computer readable medium, preferably, the control program further causes the one or plurality of processors to change the points in response to a game operation of the stream user in the second game, and upon the points reaching predetermined points, end execution of the second game and associate a game medium image with the stream user, the game medium image showing the predetermined game medium.

In addition, in the non-transitory computer readable medium, preferably, the control program further causes the one or plurality of processors to, upon the points reaching the predetermined points in the second game, associate an image with each of the stream user and the viewing user who has given the instructions, the image including the game medium image showing the predetermined game medium, an image showing the first character object representing the stream user, and an image showing a second character object representing the viewing user who has given the instructions during execution of the second game.

The control method for a terminal provides a method of controlling a terminal including one or a plurality of processors, the method causing the one or plurality of processors to execute a process including: displaying a character video including a first character object representing a stream user, and transmitting information to display the character video to a terminal of at least one viewing user different from the stream user; displaying a screen for a game played by the stream user, and transmitting information to display a game video including the screen for the game to the terminal of the at least one viewing user; and producing a game effect according to instructions for the stream user from a terminal of one of the at least one viewing user. At least one of a screen for a first game and a screen for a second game is displayed as a screen for the game according to progress of the game, and in the producing of the game effect, it is determined whether the game effect to be produced is a game effect on the first game, and upon determination that the game effect to be produced is not a game effect on the first game, a game effect different from the game effect on the first game is produced.

The terminal includes one or a plurality of processors configured to execute a process including: receiving information to display a character video including a first character object representing a stream user from a terminal of the stream user; receiving information to display a game video including a screen for a game played by the stream user from the terminal of the stream user; and transmitting instructions for the stream user to produce a game effect. At least one of a screen for a first game and a screen for a second game is displayed as a screen for the game according to progress of the game, and in producing of the game effect, it is determined whether the game effect to be produced is a game effect on the first game, and upon determination that the game effect to be produced is not a game effect on the first game, a game effect different from the game effect on the first game is produced.

The control method for a server apparatus provides a method of controlling a server apparatus including one or a plurality of processors, the method causing the one or plurality of processors to execute a process including: receiving information to display a character video including a first character object representing a stream user from a terminal of the stream user; transmitting information to display the character video to a terminal of at least one viewing user different from the stream user; receiving information to display a game video including a screen for a game played by the stream user from the terminal of the stream user; transmitting the information to display the game video to the terminal of the at least one viewing user; and producing in the terminal of the stream user a game effect according to instructions for the stream user from a terminal of one of the at least one viewing user. At least one of a screen for a first game and a screen for a second game is displayed as a screen for the game according to progress of the game, and in the producing of the game effect, it is determined whether the game effect to be produced is a game effect on the first game, and upon determination that the game effect to be produced is not a game effect on the first game, a game effect different from the game effect on the first game is produced.

The method performed by one or more processors provides a method performed by one or a plurality of processors which execute a computer-readable command, the method including transmitting a computer program to a terminal of a stream user via a communication line, the terminal being configured to stream a character video and a game video to a terminal of a viewing user via a communication line, the character video including a first character object representing the stream user, the game video including a screen for a game played by the stream user, the computer program causing the terminal of the stream user to execute a process including receiving instructions from the terminal of the viewing user via a communication line, the instructions being for the stream user and generated by an operation of the viewing user who views the game video; and producing a game effect according to the instructions. At least one of a screen for a first game and a screen for a second game is displayed as a screen for the game according to progress of the game. In the producing of the game effect, it is determined whether the game effect to be produced is a game effect on the first game, and upon determination that the game effect to be produced is not a game effect on the first game, a game effect different from the game effect on the first game is produced.

The stream system includes a stream terminal of a stream user, a viewing terminal of at least one viewing user different from the stream user, and a server apparatus capable of communicating with the stream terminal and the viewing terminal. The stream terminal is configured to display a character video including a first character object representing the stream user and transmit information to display the character video to the server apparatus, and display a screen for a game played by the stream user and transmit information to display a game video including the screen for the game to the server apparatus, the viewing terminal is configured to transmit instructions for the stream user to produce a game effect to the server apparatus, the server apparatus is configured to transmit the information to display the character video and the information to display the game video to the viewing terminal, and transmit the instructions to produce the game effect to the stream terminal, and the stream terminal is configured to upon receiving the instructions, produce the game effect according to the instructions for the stream user, display at least one of a screen for a first game and a screen for a second game as a screen for the game according to progress of the game, and in producing of the game effect, determine whether the game effect to be produced is a game effect on the first game, and upon determination that the game effect to be produced is not a game effect on the first game, produce a game effect different from the game effect on the first game.

It is possible to improve the game performance related to a streamed game video and/or the sense of togetherness between users for a stream event without making the user interface complicated by the non-transitory computer readable medium storing a control program for a terminal, the control method for a terminal, the terminal, the control method for a server apparatus, the method performed by one or more processors, and the stream system.

Hereinafter, various embodiments of the present disclosure will be described with reference to the drawings. However, it is to be noted that the technical scope of the present disclosure is not limited to those embodiments and covers their equivalents.

(Overview of Video Stream System)

Figure 1B:
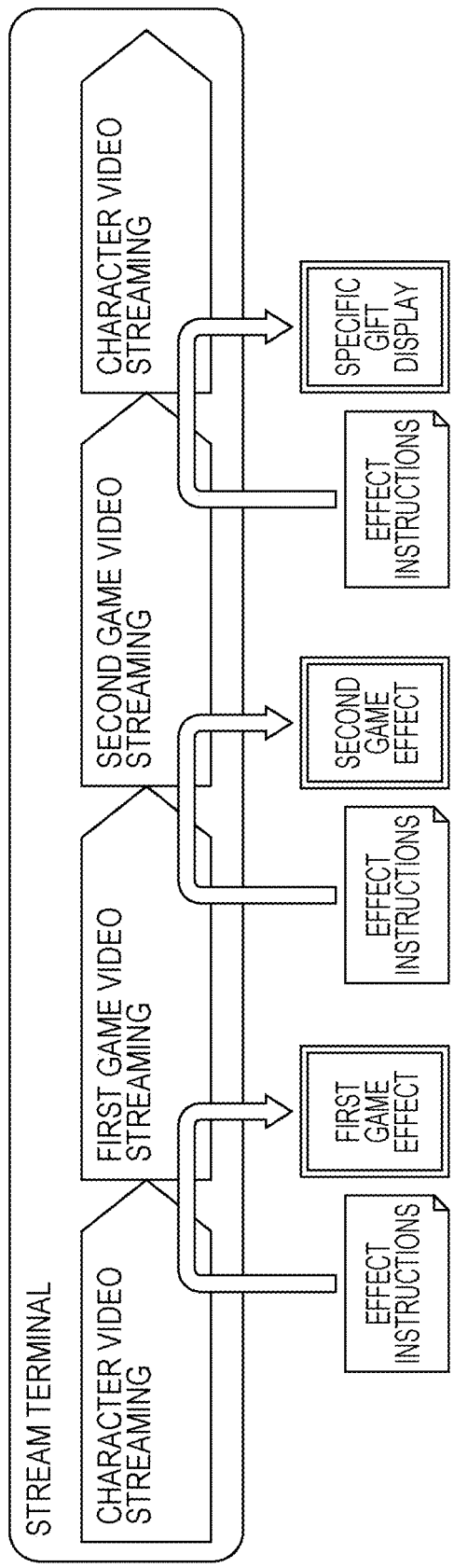

FIGS. 1A and 1B are schematic diagrams for illustrating an example of an overview of a video stream system. The video stream system includes terminals operated by respective users and a server apparatus. Each of the terminals is, for instance, a mobile terminal such as a multi-functional mobile phone (so-called "smartphone") possessed by a user. The server apparatus is a computer to provide a video stream service to terminals via a communication network.

The terminal stores a video stream application program, loads the video stream application program into a memory in response to a predetermined start operation by a user, and executes a command included in the loaded video stream application program, thereby making it possible to start a specific stream event. The terminal has a function of transmitting to a server apparatus character video data including motion data based on various types of data (such as imaging data) input by a user, and game video data to display a video for the game screen of a game being played by a user in a specific stream event. In addition, the terminal has a function of displaying a character stream screen and a game stream screen based on character video stream data and game video stream data from the server apparatus. The character video data and the game video data are each a type of "video data". Also, the character video stream data includes character video data, the game video stream data includes game video data, and the character video stream data and the game video stream data are each a type of "video stream data". In addition, the character stream screen and the game stream screen are each a type of a "stream screen".

Hereinafter, in the terminal, a user who uses at least a function of transmitting video data to the server apparatus may be referred to as a stream user, and a terminal operated by a stream user may be referred to as a stream terminal. In addition, in the terminal, a user who uses at least a function of receiving video stream data and a function of displaying a stream screen may be referred to as a viewing user, and a terminal operated by a viewing user may be referred to as a viewing terminal. Note that one terminal may have both functions of the stream terminal and the viewing terminal.

In the example illustrated in FIG. 1A, when starting a specific stream event, the stream terminal transmits character video data to the server apparatus and displays based on motion data character stream screen including a character object corresponding to the stream user. The server apparatus transmits character video stream data to the viewing terminal, the character video stream data being based on the character video data from the stream terminal. The viewing terminal displays based on the character video stream data from the server apparatus a character stream screen including a character object corresponding to the stream user.

Next, the stream terminal executes various commands contained in the game program stored in the stream terminal in response to instructions for executing a game provided by the stream user, thereby starting the game and displaying the screen of the started game. The stream terminal progresses the game based on various commands contained in the game program and a game operation input by a user. Note that in order to execute the game, the stream terminal may call the browser function incorporated in the video stream application, receive a web page (a document written by a markup language such as a hypertext markup language (HTML)) from the server apparatus using the browser function, and perform a game program incorporated in the web page. For instance, use of HTML5 as the markup language enables the stream terminal to easily execute a new game. Use of such a web application to execute a game in the stream terminal enables the producer of a game program to provide a new game for a client-side (terminal side) just by incorporating a new game program in a web page transmitted by the server apparatus, thus the production man-hours of the new game program can be significantly reduced. In addition, on the client-side, a new game can be provided only by receiving a web page without downloading a new game program, and as compared with when the game program is downloaded, it is possible to reduce the load of communication network, the communication cost and/or the communication time, and simplification of the user interface can be achieved.

The stream terminal allows at least two types of games to progress and transmits game video data to the server apparatus, the game video data including display data to display a video on the screen of the game in progress. When the at least two types of games are the first game and the second game, the second game starts in response to the end of the first game, for instance.

The server apparatus transmits game screen stream data to each viewing terminal, the game screen stream data being based on the game video data from the stream terminal. The viewing terminal displays a game stream screen based on the game screen stream data from the server apparatus, the game stream screen including the video on the screen of a game in progress in the stream terminal. When the second game ends, the stream terminal resumes transmission of the character video data and display of the character stream screen.

The viewing user can input effect instructions to produce a predetermined event effect in a specific event by operating the viewing terminal.

When obtaining effect instructions given by a viewing user from the viewing terminal during transmission of character video stream data, the stream terminal causes a specific gift object to be included in the character stream screen being displayed. In this manner, when the stream screen is a character stream screen, the stream terminal produces an event effect that a specific gift object appears (is displayed) in the character stream screen according to effect instructions given by a viewing user. In addition, the viewing terminal causes a specific gift object to be included in the character stream screen being displayed according to effect instructions given by a viewing user during display of the character stream screen. In this manner, when the stream screen is a character stream screen, the viewing terminal produces an event effect that a specific gift object appears (is displayed) in the character stream screen according to effect instructions given by a viewing user.

When obtaining effect instructions given by a viewing user from a viewing terminal during transmission of game video stream data, the stream terminal produces a predetermined game effect on the game being played by the stream user. In this manner, when the stream screen is a game stream screen, the stream terminal produces a predetermined game effect as an event effect according to effect instructions given by a viewing user. In addition, the viewing terminal produces a predetermined game effect on the game being displayed on the game stream screen and being played by a stream user according to effect instructions given by a viewing user during display of the game stream screen. In this manner, when the stream screen is a game stream screen, the viewing terminal produces a predetermined game effect as an event effect according to effect instructions given by a viewing user.

When the predetermined game effect to be produced during transmission of game video stream data is a first game effect on the first game, the stream terminal produces the first game effect corresponding to the first game according to effect instructions given by a viewing user. For instance, when the game video stream data being transmitted is for displaying a video on the screen of the first game, the stream terminal determines that the predetermined game effect to be produced is the first game effect on the first game. Also, when the predetermined game effect to be produced during display of the game stream screen is the first game effect on the first game, the viewing terminal produces the first game effect corresponding to the first game according to effect instructions given by a viewing user. For instance, when the game stream screen being displayed includes a video on the screen of the first game, the stream terminal determines that the predetermined game effect to be produced is the first game effect on the first game.

When the predetermined game effect to be produced during transmission of game video stream data is a second game effect on the second game, the stream terminal produces the second game effect corresponding to the second game according to effect instructions given by a viewing user. For instance, when the game video stream data being transmitted is for displaying a video on the screen of the second game, the stream terminal determines that the predetermined game effect to be produced is the second game effect on the second game. Also, when the predetermined game effect to be produced during display of the game stream screen is the second game effect on the second game, the viewing terminal produces the second game effect corresponding to the second game according to effect instructions given by a viewing user. For instance, when the game stream screen being displayed includes a video on the screen of the second game, the stream terminal determines that the predetermined game effect to be produced is the second game effect on the second game.

Note that the first game effect is, for instance, the effect of reducing the execution time of the first game, and the second game effect is, for instance, the effect of changing predetermined points associated with game clear of the second game. Note that the first game effect and the second game effect may be any effect as long as the first and second game effects are different from each other.

When the moment of generation of an event effect corresponding to effect instructions given by a viewing user is during transmission of the game video stream data to display a video on the screen of the first game (during display of the game stream screen including a video on the screen of the first game), the stream terminal produces the first game effect corresponding to the first game as an event effect. In addition, when the moment of generation of an event effect corresponding to effect instructions given by a viewing user is during display of the game stream screen including a video on the screen of the first game, the viewing terminal produces the first game effect corresponding to the first game as an event effect.

As in the example illustrated in FIG. 1B, even when effect instructions given by a viewing user is obtained by the stream terminal during transmission of the character video stream data (during display of the character stream screen), while an event effect corresponding to effect instructions given by another viewing user and obtained earlier is being produced in the order of obtained effect instructions, transmission of the game video stream data to display a video on the screen of the first game (display of the game stream screen including a video on the screen of the first game) may be started. In such a case, even when the stream terminal obtains effect instructions given by a viewing user during transmission of the character video stream data (during display of the character stream screen), if the moment of generation of an event effect is during transmission of the game video stream data to display a video on the screen of the first game (during display of the game stream screen including a video on the screen of the first game), the stream terminal produces the first game effect corresponding to the first game.

When the moment of generation of an event effect corresponding to effect instructions given by a viewing user is during transmission of the game video stream data to display a video on the screen of the second game (during display of the game stream screen including a video on the screen of the second game), the stream terminal produces the second game effect corresponding to the second game as an event effect. In addition, when the moment of generation of an event effect corresponding to effect instructions given by a viewing user is during display of the game stream screen including a video on the screen of the second game, the viewing terminal produces the second game effect corresponding to the second game as an event effect.

For instance, even when effect instructions given by a viewing user is obtained by the stream terminal during transmission of the game video stream data to display a video on the screen of the first game (during display of the game stream screen including a video on the screen of the first game), while an event effect corresponding to effect instructions given by another viewing user and obtained earlier is being produced in the order of obtained effect instructions, transmission of the game video stream data to display a video on the screen of the second game (display of the game stream screen including a video on the screen of the second game) may be started. In such a case, even when the stream terminal obtains effect instructions given by a viewing user during transmission of the game video stream data to display a video on the screen of the first game (during display of the game stream screen including a video on the screen of the first game), if the moment of generation of an event effect is during transmission of the game video stream data to display a video on the screen of the second game (during display of the game stream screen including a video on the screen of the second game), the stream terminal produces the second game effect corresponding to the second game.

Also, when the moment of generation of an event effect corresponding to effect instructions given by a viewing user is during transmission of the character video stream data (during display of the character stream screen), the stream terminal produces an effect that a specific gift object appears (is displayed) in the character stream screen as an event effect. Also, when the moment of generation of an event effect corresponding to effect instructions given by a viewing user is during display of the character stream screen, the viewing terminal produces an effect that a specific gift object appears (is displayed) in the character stream screen as an event effect.

For instance, even when effect instructions given by a viewing user is obtained by the stream terminal during transmission of the game video stream data to display a video on the screen of the second game (during display of the game stream screen including a video on the screen of the second game), while an event effect corresponding to effect instructions given by another viewing user and obtained earlier is being produced in the order of obtained effect instructions, transmission of the character video stream data (display of the character stream screen) may be started. In such a case, even when the stream terminal obtains effect instructions given by a viewing user during transmission of the game video stream data to display a video on the screen of the second game (during display of the game stream screen including a video on the screen of the second game), if the moment of generation of an event effect is during transmission of the character video stream data (during display of the character stream screen), the stream terminal produces an effect that a specific gift object appears (is displayed) in the character stream screen.

As described above with reference to FIGS. 1A and 1B, in the control program for the terminal, the control method for the terminal, the terminal, the control method for the server apparatus, and the video stream system, even when the same effect instructions are input by a viewing user, an event effect according to the stream screen being displayed and/or the video stream data being transmitted are produced. In this manner, the control program for the terminal, the control method for the terminal, the terminal, the control method for the server apparatus, and the video stream system make it possible to improve the game performance of each game stream screen and to enhance the sense of togetherness between the stream user and the viewing users for each stream event without using respective user interfaces for the stream screen being displayed and/or the video stream data being transmitted (without making the user interface complicated).

Note that explanation for FIGS. 1A and 1B described above is merely a description for better understanding of the contents of the present disclosure. Specifically, the present disclosure may be practiced in the embodiments described below and may be practiced in various modifications without substantially departing from the principles of the present disclosure. Such modifications are all included in the disclosed scope of the present disclosure.

(Video Stream System 1)

Figure 2:
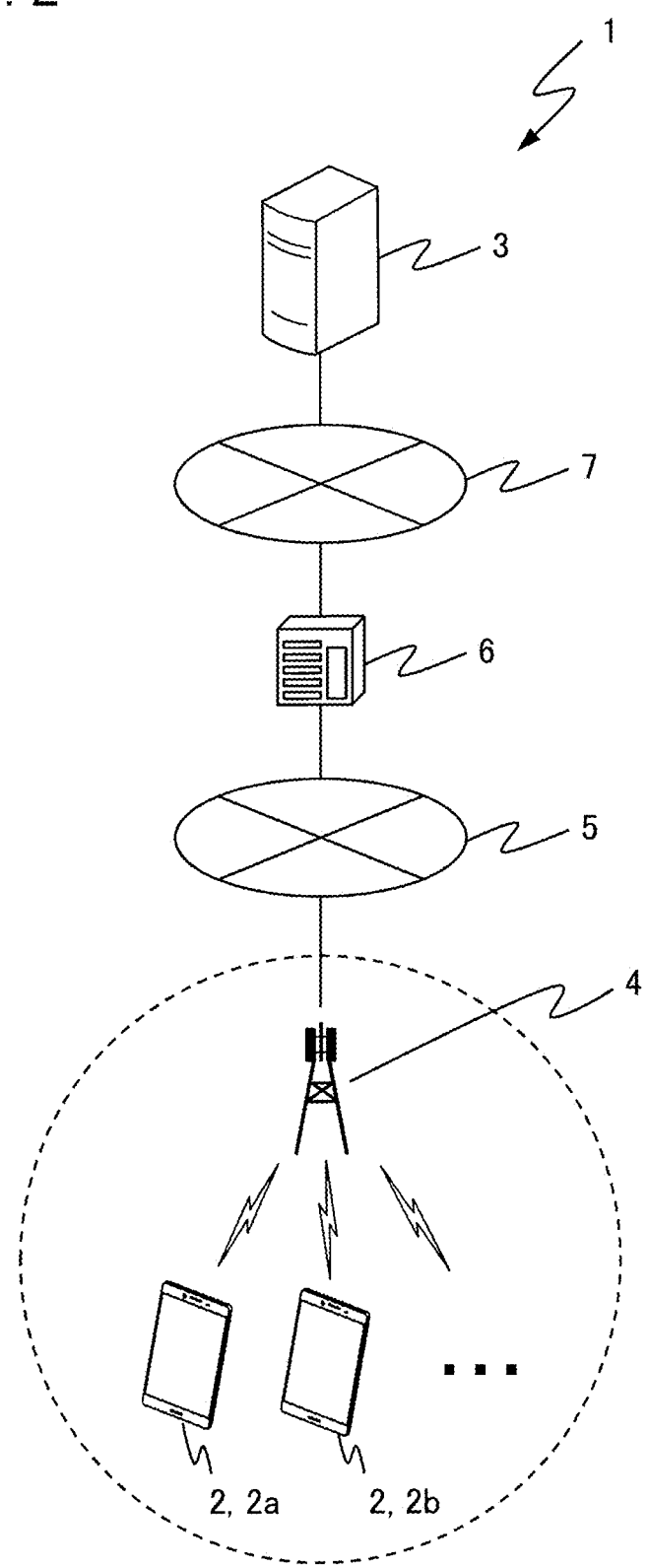
FIG. 2 is an illustration showing an example of a schematic configuration of the video stream system.

FIG. 2 is an illustration showing an example of a schematic configuration of a video stream system 1. The video stream system 1 includes terminals 2 operated by respective users, and a server apparatus 3. For instance, the terminals 2 and the server apparatus 3 are connected to each other via a base station 4, a mobile communication network 5, a gateway 6, and a communication network such as the Internet 7. Communication is performed between the terminals 2 and the server apparatus 3, based on a predetermined communication protocol. The predetermined communication protocol is, for instance, Hypertext Transfer Protocol (HTTP).

Each terminal 2 is an information processing device, such as a smartphone. The terminal 2 may also be a mobile phone, a tablet terminal, a tablet personal computer (PC), an electronic book reader, or a wearable computer. The terminal 2 may also be a portable game player, a game console or a notebook PC. The terminal 2 may be any information processing device as long as the device enables generation of video data and/or reproduction of video data based on imaging data captured. Note that the terminal 2 is a type of a video stream device.

In the example illustrated in FIG. 2, one server apparatus 3 is illustrated as a component of the video stream system 1. However, the server apparatus 3 may be a set of physically separate server apparatuses. In this case, the server apparatuses may each have the same function or may collectively have the function of one server apparatus 3 in a distributed manner. Note that the server apparatus 3 is a type of a video stream device.

(Terminal 2)

Figure 3:
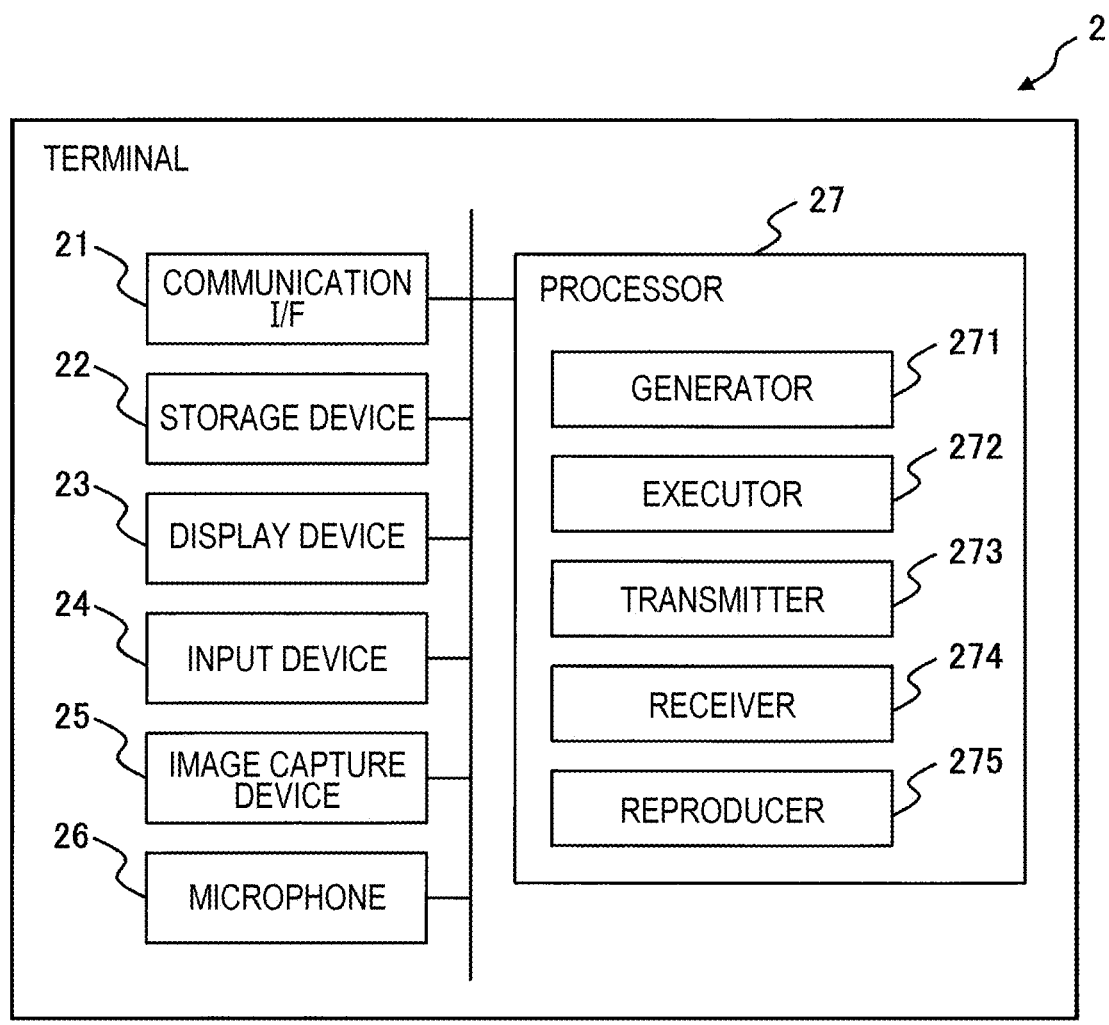
FIG. 3 is a diagram illustrating an example of a schematic configuration of a terminal.

FIG. 3 is a diagram illustrating an example of a schematic configuration of the terminal 2.

The terminal 2 is connected to the server apparatus 3 via the base station 4, the mobile communication network 5, the gateway 6 and the Internet 7, and communicates with the server apparatus 3. A stream terminal 2a generates character video data including motion data and game video data to display a video on the game screen of a game being played by a user, based on various types of data (such as imaging data) input by a user, and transmits the generated character video data and game video data to the server apparatus 3. In addition, a viewing terminal 2b receives character video stream data and game video stream data which are streamed from the server apparatus 3, and displays a character stream screen and a game stream screen based on the received character video stream data and game video stream data. In order to implement such functions, the terminal 2 (the stream terminal 2a and the viewing terminal 2b) includes a communication I/F 21, a storage device 22, a display unit 23, an input device 24, an imaging device 25, a microphone 26 and a processor 27.

The communication I/F 21 is implemented as hardware, firmware, communication software, such as a Transmission Control Protocol/Internet Protocol (TCP/IP) driver and a Point-to-Point Protocol (PPP) driver, or a combination thereof. The terminal 2 is able to transmit data to another device and receive data from another device via the communication I/F 21.

The storage device 22 is a semiconductor memory device, such as a read only memory (ROM), a random access memory (RAM), for instance. The storage device 22 stores an operating system program, a driver program, an application program and data which are used for processing in the processor 27. The driver program stored in the storage device 22 includes an output device driver program that controls the display unit 23 and an input device driver program that controls the input device 24. The application program stored in the storage device 22 includes a control program that generates video data and reproduces a stream screen based on the video stream data from the server apparatus 3. The data stored in the storage device 22 includes identifying information (for instance, a user identification (ID)) to uniquely identify a user. In addition, the storage device 22 stores the later-described model data, and background data as the data. In addition, the storage device 22 stores the later-described user table T1, object table T2, and effect instruction history table T3 as the data. Alternatively, the storage device 22 may temporarily store data related to predetermined processing. Note that the control program may be the one transmitted from the server apparatus 3 or other apparatuses. In an exemplary implementation, storage device 22 is a non-transitory computer readable medium that stores computer executable instructions for execution by processor 27.

The background data is asset data to construct a virtual space which includes a dynamic image in a stream screen displayed based on video stream data. The background data includes data to draw the background of a virtual space, data to draw various objects included in a stream screen, and data to draw various background objects other than those displayed on the stream screen. The background data may include object location information showing the positions of various background objects in the virtual space.

The display unit 23 is a liquid crystal display. Note that the display unit 23 may also be an organic electro-luminescence (EL) display. The display unit 23 displays a video image according to the video image data and/or a still image according to still image data which are supplied from the processor 27.

The input device 24 is a pointing device, such as a touch panel. The touch panel can detect various touch operations, such as a tap, a double tap, and a drag of a user. The touch panel may include an electrostatic capacitive proximity sensor, and may be configured to be able to detect a non-contact operation of a user. Note that the input device 24 may also be an input key. A user can input a character, a number and a symbol, or a position on the display screen of the display unit 23 using the input device 24. When operated by a user, the input device 24 generates a signal corresponding to the operation. The input device 24 then supplies the generated signal to the processor 27 as instructions of the user.

The imaging device 25 is a camera having an imaging optical system, an imaging device and an image processor. The imaging optical system is, for instance, an optical lens, and forms an image of light flux from an object on the imaging surface of the imaging device. The imaging device is a charge coupled device (CCD) or a complementary metal oxide semiconductor (CMOS), and outputs an image of an object formed on the imaging surface. The image processor produces video image data in a predetermined file format for every predetermined period from images continuously generated by the imaging device, and outputs the video image data as imaging data. Alternatively, the image processor produces still image data in a predetermined file format from an image generated by the imaging device, and outputs the still image data as imaging data.

The microphone 26 is a sound collector configured to obtain sound uttered by a user, and convert the sound into sound data. The microphone 26 is configured to obtain sound input of a user, and the sound input of the user obtained by the microphone 26 is converted into sound data, which is transmitted to the server apparatus 3 via the communication I/F 21.

The processor 27 is a processing unit that loads the operating system program, the driver program and the application program stored in the storage device 22 into the memory, and executes the commands contained in the loaded programs. The processor 27 is, for instance, an electronic circuit, such as a central processing unit (CPU), a micro processing unit (MPU), a digital signal processor (DSP), and a graphics processing unit (GPU), or a combination of various electronic circuits. The processor 27 may be implemented by an integrated circuit, such as an application specific integrated circuit (ASIC), a programmable logic device (PLD), a field programmable gate array (FPGA), and a micro controller unit (MCU). In FIG. 3, the processor 27 is illustrated as a single component, however, the processor 27 may be a set of physically separate processors.

The processor 27 executes various commands contained in the control program, thereby functioning as a generator 271, an executor 272, a transmitter 273, a receiver 274, and a reproducer 275. The functions of the generator 271, the executor 272, the transmitter 273, the receiver 274, and the reproducer 275 will be described below.

Further, processor 27 and the functionality of sub-elements generator 271, executor 272, transmitter 273, receiver 274 and reproducer 275 may be implemented using circuitry or processing circuitry which includes general purpose processors, special purpose processors, integrated circuits, ASICs, conventional circuitry and/or combinations thereof which are configured or programmed to perform the disclosed functionality. Processors are considered processing circuitry or circuitry as they include transistors and other circuitry therein. The processor 27 may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

(Various Tables)

Figure 4A:
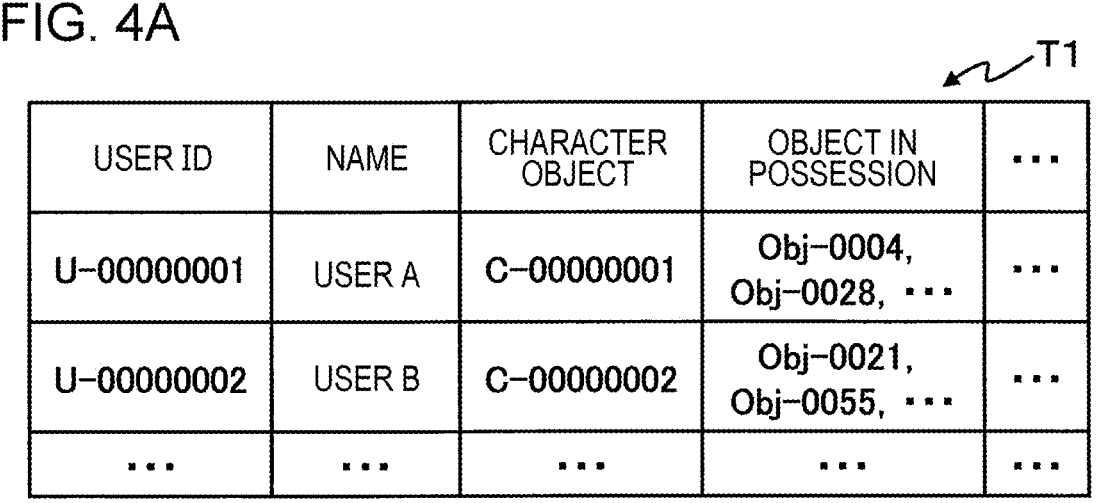
FIGS. 4A to 4C are tables illustrating an example of data structures of various tables.
Figure 4B:
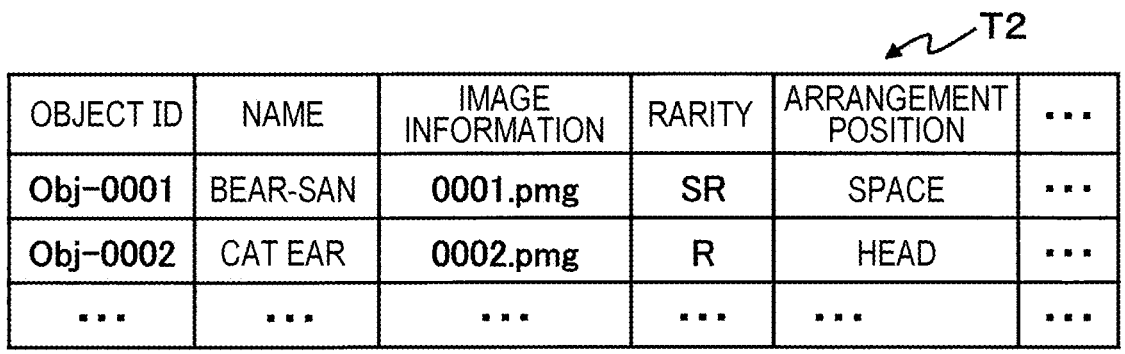
Figure 4C:
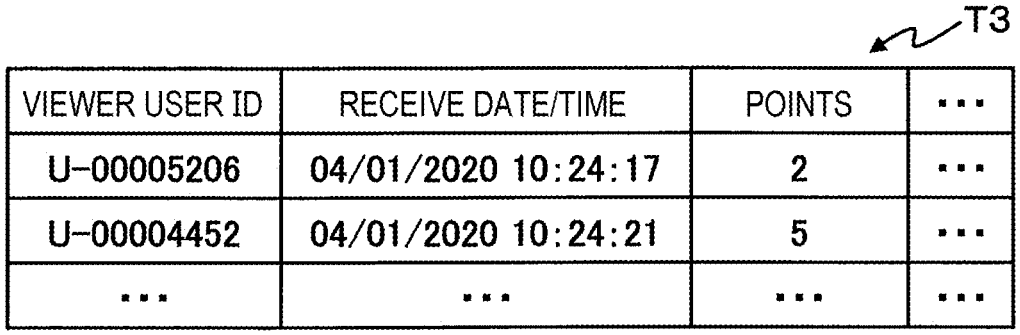

FIGS. 4A to 4C are tables illustrating an example of data structures of a user table T1, an object table T2, and an effect instruction history table T3 stored in the storage device 22. Note that the user table T1, the object table T2, and the effect instruction history table T3 may be stored in a storage device 32 of the server apparatus 3. In this case, the terminal 2 may obtain (receive) the latest user table T1, object table T2, and effect instruction history table T3 at a predetermined timing to store the tables in the storage device 22.

(User Table T1)

FIG. 4A is an example of a data structure of the user table T1 for managing the users (the stream user and viewing users) who participate in the video stream system 1. In the user table T1, for each user, a user ID, a name, a character object and an object in possession are stored in association with each other. In the user table T1, a coin in possession (information showing the total amount of "coins" having a virtual monetary value possessed by a user) of a user and/or user points may be stored in association with the user ID of the user.

The user ID is an example of identifying data to uniquely identify each user. The name is an example of data showing the name of each user.

The character object is, for instance, a model ID to identify model data for generating an animation of a character object. The model data is stored in the storage device 22 in association with the model ID. The model data may be a three-dimensional model data for generating a three-dimensional animation, or may be two-dimensional model data for generating a two-dimensional model data. The model data includes, for instance, rig data (so-called "skeleton data") showing the skeletal frame of the face of a character object and parts other than the face, and surface data showing the shape and texture of the surface of the character object. The model data may include multiple pieces of model data different from each other. The multiple pieces of model data may have respective pieces of rig data different from each other, or may have the same rig data. The multiple pieces of model data may have respective pieces of surface data different from each other, or may have the same surface data.

The object in possession is an object ID showing the object possessed by a user. For instance, the object in possession may be an object which is possessed by a user consuming "coins" having a virtual monetary value using the purchase function in the video stream system 1. For instance, a stream user operates the terminal 2 during streaming of a character stream screen (during transmission of character video data), thus an object in possession (attachment object) can be attached to a character object which is included in the character stream screen and corresponds to the stream user. Also, a stream user operates the terminal 2 during streaming of a character stream screen (during transmission of character video data), thus an object in possession (wall paper object) can be disposed on the background of a character object which is included in the character stream screen, and corresponds to the stream user.

In the user table T1, for each user, object display information in association with the user may be stored. For instance, the object display information is an object ID showing an attachment object which is displayed on the character stream screen in association with a character object corresponding to the stream user.

(Object Table T2)

FIG. 4B is an example of a data structure of the object table T2 for managing objects, one of which is selected as a gift object. In the object table T2, for each object, an object ID, image information, a rarity and an arrangement position are stored in association with each other.

The object ID is an example of identifying data to uniquely identify an object. The image information is one or more still images corresponding to an object. The image information may also be one or more types of video images corresponding to an object. The rarity is information showing the degree of rarity of an object. The arrangement position is information showing the position where image information on an object is displayed. Note that when the display position and the display range of a character object are defined, information showing a relative position to the character object may be stored as the arrangement position.

Each object is classified into multiple types. The object includes, for instance, an effect object showing an effect gift, a normal object showing a normal gift, an attachment object showing an attachment gift, and a message object showing a message gift. Hereinafter, the image information and the arrangement position according to the type of an object will be described.

The effect object is an object that gives an effect on the impression of the whole character stream screen. The effect object is, for instance, an object representing confetti. When the effect object is an object representing confetti, an image showing multiple sheets of paper is stored as image information.

Information showing "space" is stored as an arrangement position of an effect object. For instance, an object representing confetti is displayed on the whole character stream screen. Also, the effect object may be displayed overlapping with a character object. Unlike the attachment object described below, the effect object is displayed without being associated with a specific part of the character. In this manner, the terminal 2 of the video stream system 1 displays an effect object according to instructions given by a viewing user, thereby making it possible to change the impression of the whole character stream screen as compared with before the effect object is displayed.

A normal object is, for instance, an object representing a plush toy, a bouquet, an accessory, or an article suitable for a gift or a present. Information showing "space" is stored as an arrangement position of a normal object. For instance, a normal object is associated with information on a predetermined movement route, and the normal object is displayed, which moves along the predetermined movement route in the character stream screen. Information showing "space", stored as an arrangement position of a "normal object" may be classified into multiple types. The "space" of multiple types is, for instance, "the central space" (the area at the center of the display screen when the screen is divided into thirds horizontally), "the left space" (the area on the left side of the display screen when the screen is divided into thirds horizontally), and "the right space" (the area on the right side of the display screen when the screen is divided into thirds horizontally). Alternatively, "space" of multiple types is, for instance, "the central space" (the area at the center of the display screen when the screen is divided into thirds vertically), "the upper space" (the area on the upper side of the display screen when the screen is divided into thirds vertically), and "the lower space" (the area on the lower side of the display screen when the screen is divided into thirds vertically). In this case, a movement route in association with a normal object is set in the "space" of the type in association with the arrangement position of the normal object. For instance, when information showing "the right space" is stored for a normal object, the normal object is associated with information on a movement route for moving in the area on the right side of the screen when the display screen is divided into thirds horizontally. Note that a normal object may be displayed overlapping with a character object. In this case, unlike the attachment object described below, a normal object is displayed without being associated with a specific part of the character object.

When a normal object is displayed overlapping with a character object, the normal object may be displayed overlapping with the "parts other than the "head" including the "face"" of the character object, for instance. In this case, the normal object is displayed without overlapping with the "head" of the character object. Alternatively, a normal object may be displayed overlapping with the "parts other than the "upper half body" including the "face"" of the character object. In this case, the normal object is displayed without overlapping with the "upper half body" of the character object.

The attachment object is an object which is displayed on a character stream screen in association with a specific part (attachment position) of a character object. The specific part is, for instance, the forward left side, the forward right side, the rearward left side, the rearward right side, the central front side, the central rear side, the left eye, the right eye, the left ear, the right ear, or the whole hair in the head of a character object. Alternatively, the specific part may be a thumb, a ring finger, a wrist, an elbow, a shoulder, an upper arm, a whole hand, or a whole arm.

An attachment object in association with a specific part of a character object is displayed on the character stream screen so as to be in contact with the specific part of the character object. Alternatively, an attachment object in association with a specific part of a character object may be displayed on the character stream screen so as to cover part or all of the specific part of the character object. The specific part may be identified by three-dimensional location information showing a position in a three-dimensional coordinate space, or may also be in association with information on location in a three-dimensional coordinate space.

The image information on an attachment object is, for instance, image information representing an accessory (a headband, a necklace or an earring), clothes (a T-shirt or a one-piece dress), a costume to be attached to a character object, or anything other than those, attachable to a character object.

Information showing an attachment part is stored as an arrangement position of an attachment object, the information indicating which part of a character object is in association with the attachment object. For instance, when the attachment object is a "headband", information showing the "head" of a character object is stored as the arrangement position of the attachment object. In addition, when the attachment object is a "T-shirt", information showing the "trunk" of a character object is stored as the arrangement position of the attachment object.

Information showing multiple attachment parts in a three-dimensional coordinate space may be stored as the arrangement position of an attachment object. For instance, when the attachment object is a "headband", information showing two parts, that is, the "rear left side of head" and the "rear right side of head" of a character object may be stored as the arrangement position of the attachment object. Thus, the attachment object representing a "headband" is displayed so as to be attached to both the "rear left side of head" and the "rear right side of head" of a character object.

When multiple types of attachment objects having a common attachment position are attached to a character object, the multiple types of attachment objects are attached to the character object at different times. Thus, the multiple types of attachment objects having a common attachment part are not attached to the character object at the same time. For instance, when "head" is stored as the attachment position of an attachment object showing a "headband" and an attachment object showing a "hat", the attachment object showing a "headband" and the attachment object showing a "hat" are not displayed on the head of the character object at the same time.

In the object table T2, a display time according to the type of an object may be stored in association with the object ID of the object. For instance, the display time of an attachment object, longer than the display time of an effect object and the display time of a normal object, may be stored. For instance, when "60 seconds" is stored as the display time of an attachment object, "five seconds" may be stored as the display time of an effect object, and "10 seconds" may be stored as the display time of a normal object.

(Effect Instruction History Table T3)

FIG. 4C is an example of a data structure of an effect instruction history table T3 for managing information which shows effect instructions transmitted from the viewing terminal 2b. In the effect instruction history table T3, for each user, a viewing user ID, receive date/time and points are stored in association with the other.

The viewing user ID is an example of identifying data to uniquely identify a viewing user who has input effect instructions. The receive date/time is information showing the date/time when effect instructions were received from the viewing terminal 2b.

The points are numeric information showing the value of a gift object corresponding to effect instructions. For instance, the points indicate a value which corresponds to "coins" having a virtual monetary value consumed when a stream user obtains a gift object.

Every time receiving effect instructions, the stream terminal 2a retrieves the viewing user ID and points included in the received effect instructions, and stores the retrieved viewing user ID, the receive date/time, and points of the effect instructions in the effect instruction history table T3 in association with each other as a new record. Every time receiving effect instructions from the server apparatus 3, given by a viewing user of another viewing terminal 2b, the viewing terminal 2b retrieves the viewing user ID and points included in the received effect instructions, and stores the retrieved viewing user ID, receive date/time, and points of the effect instructions in the effect instruction history table T3 in association with each other as a new record. Every time receiving effect instructions input by a viewing user of the viewing terminal 2b, the viewing terminal 2b stores the viewing user ID of the viewing user, points corresponding to a designated specific gift object, and the input date/time (transmission date/time) of the effect instructions in the effect instruction history table T3 in association with each other as a new record.

Hereafter, the functions of the generator 271, the executor 272, the transmitter 273, the receiver 274, and the reproducer 275 will be described.

(Generator 271)

Figure 5A:
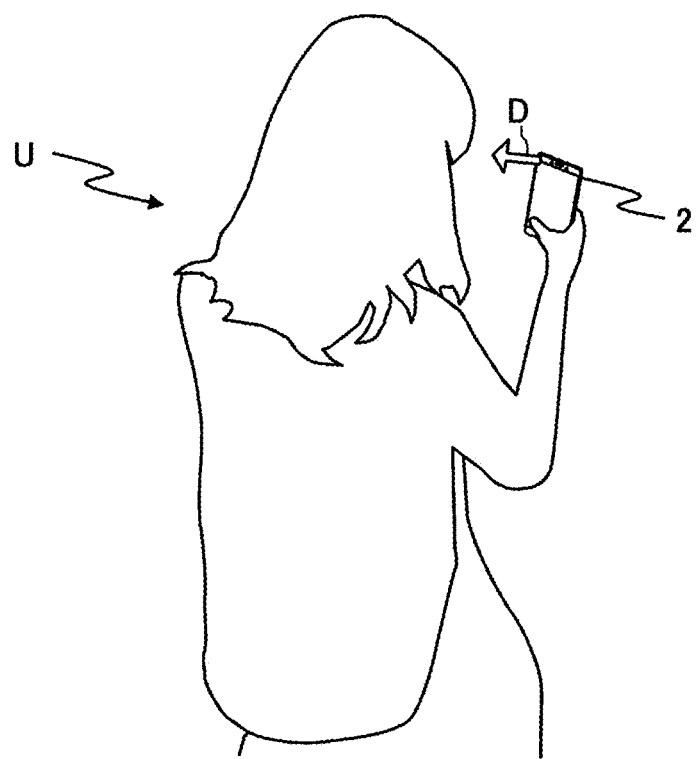
FIG. 5A is a perspective view illustrating an example of a user who operates a terminal.
Figure 5B:
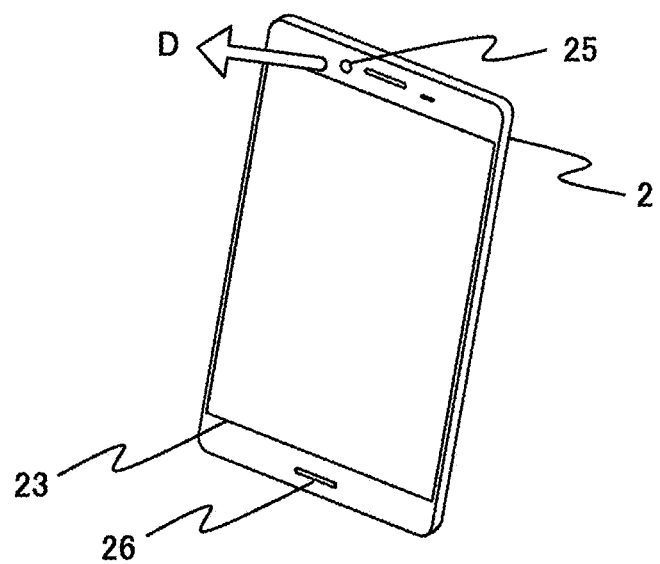
FIG. 5B is a perspective view illustrating an example of a terminal.

Referring to FIGS. 5A and 5B, an example of the function of the generator 271 will be described. As illustrated in FIGS. 5A and 5B, the imaging device 25 of the terminal 2 held by a stream user U is installed in the terminal 2 so that the face of the stream user U looking at the display screen of the display unit 23 is in an image capture direction D, for instance. The imaging device 25 continuously captures the face of the stream user U in the image capture direction D to obtain imaging data of the face of stream user U, and outputs the imaging data to the processor 27. The imaging device 25 may obtain imaging data by capturing the parts other than the face of the stream user U, for instance, the head, the arms, the hands (including the fingers), the chest, the trunk, the legs, and parts other than those. Alternatively, the imaging device 25 may be a 3D camera that can detect the depth of the human face.

The generator 271 generates face motion data as needed as time elapses based on the imaging data continuously output by the imaging device 25, the face motion data being digital representation of the motion of the face of the stream user U. The face motion data may be generated for each predetermined sampling time interval. In this manner, the face motion data generated by the generator 271 enables the face motion (change in the facial expression) of the stream user U to be digitally represented in time series.

The generator 271 may generate body motion data along with face motion data or separately from face motion data, the body motion data being digital representation of the positions and directions of the parts (the head, the arms, the hands (including the fingers), the chest, the trunk, the legs, and parts other than those) of the stream user U.

The body motion data may be generated based on the detection information from a publicly known motion sensor attached to the stream user U. In this case, the communication I/F 21 of the terminal 2 has a predetermined communication circuit to obtain the detection information from the motion sensor attached to the stream user U by wireless communication. The generator 271 then generates body motion data based on the detection information obtained by the communication I/F 21. The body motion data may be generated for each predetermined sampling time interval. Thus, the body motion data generated by the generator 271 can digitally represent the motion of the body of the stream user U in time series.

The generator 271 suspends generation of face motion data and/or body motion data according to instructions for executing a game given by the stream user, and when the game executed by the later-described executor 272 ends, resumes the generation of the face motion data and/or the body motion data.

The generation of body motion data based on the detection information from a motion sensor attached to the stream user U may be performed, for instance, in a photo studio. In this case, the photo studio may be provided with a base station, a tracking sensor, and a display. The base station is, for instance, a multi-axis laser emitter. The motion sensor attached to the stream user U may be, for instance, Vive Tracker provided by HTC CORPORATION, and the base station may be, for instance, the one provided by HTC CORPORATION.

Alternatively, a supporter computer may be installed in another room adjacent to the photo studio. The display of the photo studio may be configured to display information received from the support computer. The server apparatus 3 may be installed in the same room in which the supporter computer is installed. The room in which the supporter computer is installed and the photo studio may be separated by a glass window. In this case, an operator of the supporter computer can visually recognize the stream user. The supporter computer may be configured to allow the setting of various types of devices provided in the photo studio to be changed in response to an operation of the operator. For instance, the supporter computer is capable of changing the setting of an interval of scanning performed by the base station, the setting of the tracking sensor, and various settings of various types of instruments other than those. The operator may input a message into the supporter computer, and the input message may be displayed on a display of the photo studio.

(Executor 272)

The executor 272 executes various commands contained in the control program (game program) stored in the storage device 22 according to instructions for executing a game given by the stream user, starts the game, and displays a game stream screen containing the screen of the started game on the display unit 23. The executor 272 progresses at least two types of games based on the various commands contained in the control program and the game operation input by the stream user, and displays the game screen of the game in progress on the display unit 23.

The executor 272 starts the first game between the at least two types of games according to instructions for executing the game given by the stream user, and starts the second game upon the end of the first game. When ending all types of games, the executor 272 notifies the generator 271 of the end of the games.

(Transmitter 273)

When face motion data and/or body motion data are generated by the generator 271, the transmitter 273 transmits character video data to the server apparatus 3 via the communication I/F 21, the character video data including the generated face motion data and/or body motion data, and the stream user ID stored in the storage device 22. Hereinafter, face motion data and body motion data may be collectively referred to as motion data.

Also, when a game is executed by the executor 272, the transmitter 273 transmits game video data to the server apparatus 3 via the communication I/F 21, the game video data including display data to display a video on the game screen of the game being executed, and the stream user ID stored in the storage device 22.

The transmitter 273 may transmit the sound data of the stream user U obtained by the microphone 26 to the server apparatus 3 in real time via the communication I/F 21. Note that the transmitter 273 may include sound data synchronized with the motion data in the character video data.

The transmitter 273 transmits a display request for displaying response information on the character stream screen and a display request for displaying a gift object on the character stream screen to the server apparatus 3 via the communication I/F 21, the response information being input by a viewing user operating the input device 24, the gift object corresponding to the gift object information described below. The response information is information on comment data, evaluation data and/or gift object, and the details will be described below. Note that the display request includes a viewing user ID and the points of a gift object, stored in the storage device 22.

The transmitter 273 transmits an end request to give instructions to end a stream event to the server apparatus 3 via the communication I/F 21. For instance, the stream user performs a predetermined tap operation on the display screen of the display unit 23 of the stream terminal 2a, thus the input device 24 instructs the transmitter 273 to end the stream event. Note that the end request includes a stream user ID stored in the storage device 22.

(Receiver 274)

The receiver 274 receives video stream data transmitted from the server apparatus 3, and request stream data including various display requests via the communication I/F 21. The video stream data includes character video stream data including at least the motion data of the stream user and the user ID of the stream user, and game video stream data showing the screen of the game being played by the stream user. Note that the details of the video stream data and the request stream data will be described below.

When the request stream data includes a display request for a predetermined specific gift object, the receiver 274 identifies the display request as the effect instructions, retrieves the viewing user ID and points included in the identified effect instructions, and stores the retrieved viewing user ID, receive date/time, and points of the effect instructions in the effect instruction history table T3 in association with each other as a new record.

(Reproducer 275)

The reproducer 275 generates drawing data to display a character stream screen based on the motion data generated by the generator 271 and/or the motion data included in the character video stream data received by the receiver 274, and displays the character stream screen on the display unit 23, based on the generated drawing data.

The reproducer 275 generates an animation of the character object based on the motion data. For instance, when motion data is generated by the generator 271, the reproducer 275 retrieves the model ID of a character object from the user table T1, the character object being associated with a user ID stored in the storage device 22. Also, when the motion data is included in the character video stream data received by the receiver 274, the reproducer 275 retrieves the model ID of a character object in association with a user ID included in the stream data from the user table T1.

Next, the reproducer 275 reads model data in association with the retrieved model ID from the storage device 22. The reproducer 275 then generates an animation of the character object based on the read model data and motion data.

When the motion data includes face motion data, the reproducer 275 generates an animation of the character object so that the facial expression of the character object changes based on the face motion data. Thus, the reproducer 275 can generate an animation of the character object which moves in synchronization with the facial expression motion of the stream user, based on the read model data and face motion data.

When the motion data includes face motion data and body motion data, the reproducer 275 generates an animation of the character object which moves in synchronization with the facial expression and the body motion of the stream user, based on the read model data, face motion data and body motion data.

The reproducer 275 generates a character stream screen which displays a video image including the generated animation of the character object, and a background image showing the background, generated using background data stored in the storage device 22. When the sound data of the stream user is obtained by the microphone 26 or when the sound data of the stream user is included in the character video stream data, the reproducer 275 may synthesize the sound (of the stream user) generated based on the sound data with the generated video image. In this manner, the reproducer 275 generates an animation of the character object which moves in synchronization with the facial expression and the body motion of the stream user, and can generate a character stream screen in which the sound of the stream user is synthesized with the animation.

Alternatively, the reproducer 275 may attach an object in possession (for instance, an attachment object) of the stream user to a character object according to a request of the stream user. For instance, when instructions to attach an attachment object to the character object of the stream user are given by the stream user operating the terminal 2 around the period of the stream event, the reproducer 275 attaches the attachment object to the character object of the stream user, based on the display request.

In addition, when the request stream data includes a display request for a gift object, the reproducer 275 identifies the information to be included in the character stream screen according to the display request.

When the identified information is the object ID of a specific effect object, the reproducer 275 refers to the object table T2 to retrieve a still image or a video image (image information) of the effect object in association with the object ID of the specific effect object, and generates a character stream screen including the retrieved still image or video image. For instance, when a display request for an effect gift showing confetti or fireworks is made, the reproducer 275 generates a character stream screen including a video image of an effect object representing confetti or fireworks.

When the identified information is the object ID of a normal object, the reproducer 275 refers to the object table T2 to retrieve a still image or a video image (image information) and its arrangement position of the normal object in association with the object ID of the normal object. Next, the reproducer 275 generates a character stream screen including the still image or the video image of the normal object disposed at the position indicated by the arrangement position.

The reproducer 275 may generate a character stream screen including a video image of a normal object which moves in the display area of the character stream screen. For instance, for a normal object, the reproducer 275 may generate a character stream screen including a video image of the normal object which falls from an upper position to a lower position of the stream screen. In this case, the normal object may be displayed in the display area of the character stream screen during the period from start of falling until the normal object falls to the lower end of the character stream screen, and after the normal object falls to the lower end of the character stream screen, the normal object may disappear from the character stream screen.

Note that the movement route of the normal object may be a route in a direction from the left to the right, a direction from the right to the left, a direction from the upper left to the lower left, or a direction other than those on the character stream screen, or may be a route along a straight-line path, a circular path, an elliptic path, a helical path, or a path other than those.

When the identified information is the object ID of a specific attachment object, the reproducer 275 refers to the object table T2 to retrieve the image information and arrangement position of the attachment object in association with the object ID of the attachment object. Next, the reproducer 275 generates a character stream screen including the image information of the attachment object attached to the attachment part indicated by the arrangement position.

For instance, when the specific attachment object is "headband representing cat ears", the reproducer 275 generates a character stream screen including a character object in which the attachment object representing "headband" is attached to the head (the arrangement position in association with the object ID of "headband"). Note that the attachment object may be displayed on the character stream screen to move while following the motion of the attachment part (arrangement position) of the character.

Note that when the gift object included in the generated character stream screen is a predetermined specific gift object (for instance, psyllium), the reproducer 275 deletes from the effect instruction history table T3 the information corresponding to the effect instructions for the specific gift object among the information (viewing user ID, receive date/time, and points) on the effect instructions stored in the effect instruction history table T3.

In addition, the reproducer 275 generates drawing data to display a game stream screen including the game screen of a game being executed by the stream user, based on the game video stream data received by the receiver 274, and displays a game stream screen on the display unit 23, based on the generated drawing data.

When the request stream data includes a display request for a specific gift object during display of the game stream screen, the reproducer 275 identifies the display request as the effect instructions, and identifies the information to be included in the character stream screen according to the display request.

(Server Apparatus 3)

Figure 6:
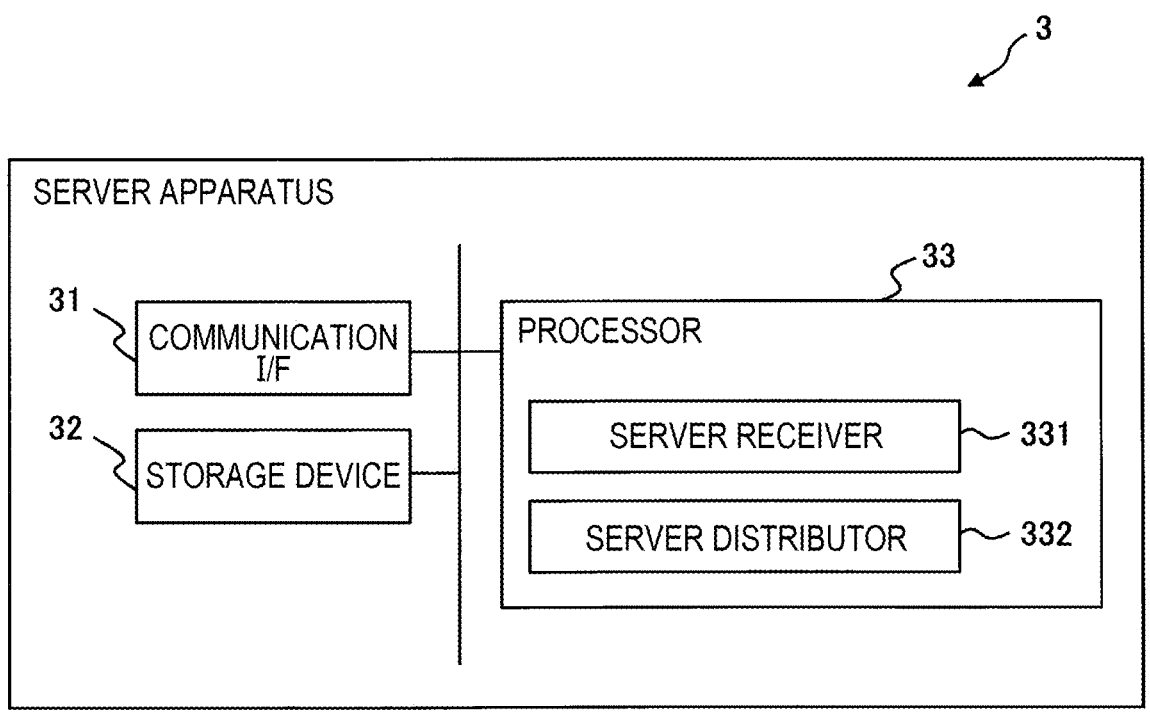
FIG. 6 is a diagram illustrating an example of a schematic configuration of a server apparatus.

FIG. 6 is a diagram illustrating an example of a schematic configuration of the server apparatus 3.

The server apparatus 3 generates character video stream data based on the motion data from the stream terminal 2a and/or the response information from the viewing terminal 2b, and streams (transmits) the stream data to one or more viewing terminals 2b. For this purpose, the server apparatus 3 includes a communication I/F 31, a storage device 32, and a processor 33.

The communication I/F 31 is implemented as hardware, firmware, communication software, such as a TCP/IP driver and a PPP driver, or a combination thereof. The server apparatus 3 can transmit data to another device and receive data from another device via the communication I/F 31.

The storage device 32 is, for instance, a semiconductor memory unit, such as a ROM, a RAM. The storage device 32 may be, for instance, a magnetic disk, an optical disc, or various storage devices other than those, capable of storing data. The storage device 32 stores an operating system program, a driver program, an application program and data which are used for processing in the processor 33. In an exemplary implementation, storage device 32 is a non-transitory computer readable medium that stores computer executable instructions for execution by processor 33.

The processor 33 is a processing unit that loads the operating system program, the driver program and the application program stored in the storage device 32 into the memory, and executes the commands contained in the loaded programs. The processor 33 is, for instance, an electronic circuit, such as a CPU, an MPU, a DSP, and a GPU, or a combination of various electronic circuits. The processor 33 may be implemented by an integrated circuit, such as an ASIC, a PLD, an FPGA, and an MCU. In FIG. 6, the processor 33 is illustrated as a single component, however, the processor 33 may be a set of physically separate processors.

The processor 33 executes various commands contained in the control program, thereby functioning as a server receiver 331, and a server streamer 332. Further, processor 33 and the functionality of sub-elements server receiver 331 and server distributor 332 may be implemented using circuitry or processing circuitry which includes general purpose processors, special purpose processors, integrated circuits, ASICs, conventional circuitry and/or combinations thereof which are configured or programmed to perform the disclosed functionality. Processors are considered processing circuitry or circuitry as they include transistors and other circuitry therein. The processor 33 may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

(Server Receiver 331)

The server receiver 331 receives video data via the communication I/F 31, the video data being transmitted from the stream terminal 2a. The video data is character video data or game video data. In addition, the server receiver 331 receives various requests (display requests and end requests) via the communication I/F 31, the various requests being transmitted from one or more viewing terminals 2b.

(Server Streamer 332)

The server streamer 332 streams stream data to the stream terminal 2a, and one or more viewing terminals 2b via the communication I/F 31, the stream data including various types of data (such as the motion data (and the user ID), the motion data and sound data (and the user ID), video data of the screen of the game, a display request, and an end request) received by the server receiver 331.

(Examples of Various Screens)

Hereinafter, examples of various screens displayed on the display unit 23 of each terminal 2 of a stream user and viewing users will be described with reference to FIGS. 7A and 7B to FIGS. 16A and 16B.

Figure 7A:
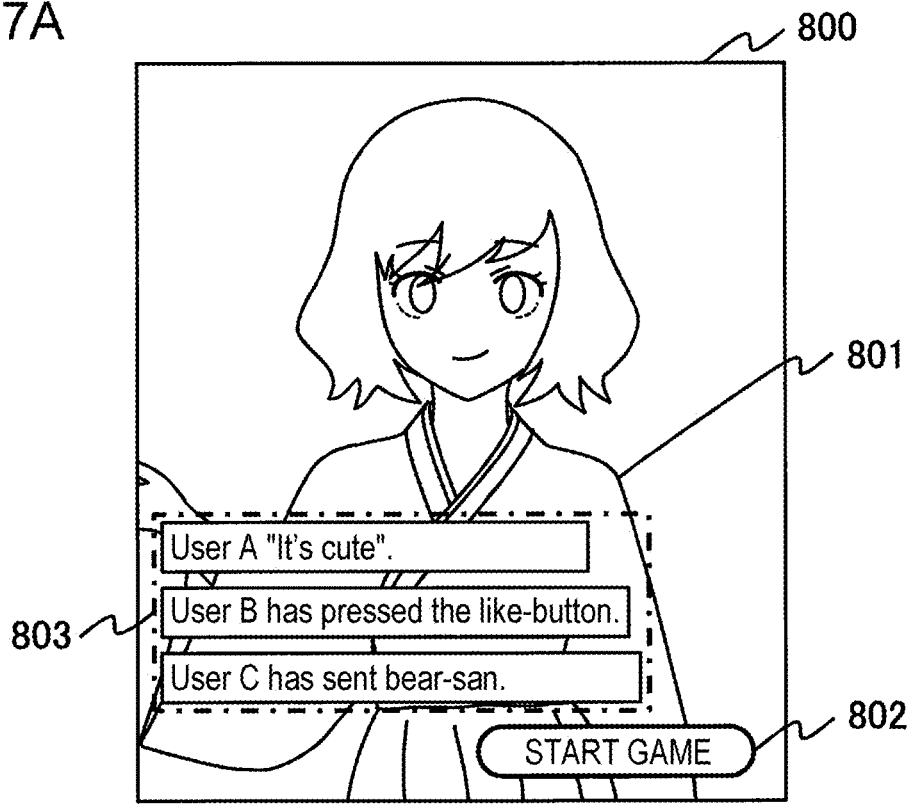
FIGS. 7A and 7B are each a view illustrating an example of a screen displayed on a display unit of a terminal.
Figure 7B:
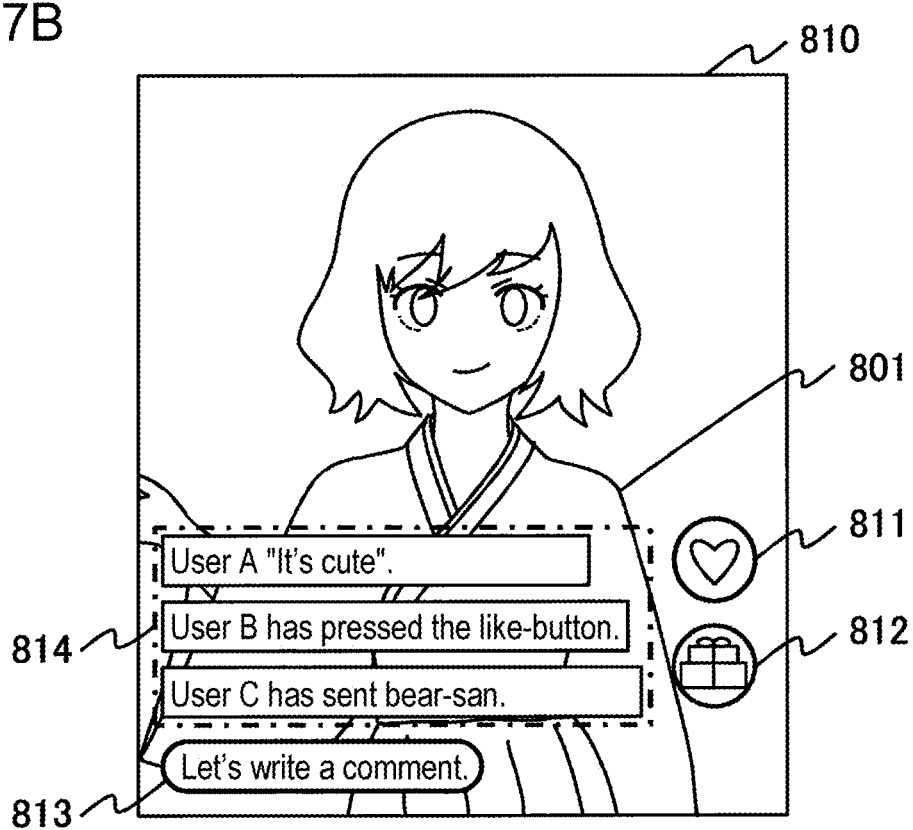

FIG. 7A is a view illustrating an example of a character stream screen 800 displayed on the display unit 23 of the stream terminal 2*a*. The character stream screen 800 includes a character object 801, a game start button 802, and a response information display area 803. FIG. 7B is a view illustrating an example of a character stream screen 810 displayed on the display unit 23 of the viewing terminal 2*b*. The character stream screen 810 includes a character object 801, an evaluation button 811, a gift button 812, a comment button 813, and a response information display area 814.

The stream terminal 2*a* executes processing to transmit the character video data by the transmitter 273 and processing to display the character stream screen 800 by the reproducer 275 concurrently (in parallel) at the same time as the start of video streaming. Note that in the stream terminal 2*a*, a stream event of a stream user starts and video streaming starts in response to selection by the stream user to a predetermined video stream start button displayed on the display unit 23.

Information showing one or more stream users during streaming is received from the server apparatus 3 by the receiver 274 of the viewing terminal 2*b*, and a video selection screen to select from one or more stream users during streaming is displayed on the display unit 23 by the reproducer 275. Next, the transmitter 273 of the viewing terminal 2*b* transmits a viewing start request to the server apparatus 3 via the communication I/F 21, the viewing start request including information showing a stream user selected from one or more stream users during streaming displayed in the video selection screen in response to an operation of the input device 24 by a viewing user.

The server receiver 331 of the server apparatus 3 receives the viewing start request via the communication I/F 31 which is transmitted from the viewing terminal 2*b*. The server streamer 332 of the server apparatus 3 streams the video stream data of a stream user via the communication I/F 31 to the viewing terminal 2*b* which has transmitted the viewing start request, the stream user being shown by the information included in the viewing start request received by the server receiver 331. The receiver 274 of the viewing terminal 2*b* then receives from the server apparatus 3 via the communication I/F 21 the video stream data of the stream user shown by the information included in the viewing start request.

When the video stream data received by the receiver 274 is character video stream data, the reproducer 275 of the viewing terminal 2*b* displays the character stream screen 810 based on the received character video stream data. When the video stream data received by the receiver 274 is game video stream data, the reproducer 275 of the viewing terminal 2*b* displays the later-described game stream screen based on the received game video stream data. Note that the server apparatus 3 registers (stores in the storage device 32) the viewing user of the viewing terminal 2*b*, which has transmitted the viewing start request, as the viewing user in viewing.

The transmitter 273 of the viewing terminal 2*b* transmits to the server apparatus 3 via the communication I/F 21 a viewing end request according to an operation of the input device 24 by a viewing user, thus ends receiving of the video stream data, and ends display of the character stream screen 810 or the game stream screen. Note that for the viewing user of the viewing terminal 2*b* which has transmitted the viewing end request, the server apparatus 3 cancels the registration as the viewing user in viewing (deletes the information which is stored in the storage device 32 and shows "viewing user in viewing").

Hereinafter, the display objects displayed on the character stream screen 800 and the character stream screen 810 will be described.

The character object 801 is an object image generated based on the motion data of the stream user. When the motion data includes face motion data, the facial expression of the character object 801 changes in synchronization with the facial expression motion of the stream user. When the motion data includes body motion data, a corresponding part of the character object 801 moves in synchronization with the body motion of the stream user.

The game start button 802 is an object image to give instructions for starting progress of a game. When the input device 24 is a touch panel, upon a tap operation performed by a stream user on the display area of the game start button 802, the game start button 802 is selected. The game start button 802 may not be displayed in a visually recognizable manner. When the game start button 802 is selected by a stream user, the input device 24 notifies the executor 272 of instructions for executing a game. When receiving instructions for executing a game from the input device 24, the executor 272 executes various commands contained in the control program (game program) stored in the storage device 22, starts the game, and displays a game stream screen containing the screen of the started game on the display unit 23.

The response information display area 803 includes the response information (information on comment data, evaluation data and/or gift object) transmitted from each viewing terminal 2*b* during display of the character stream screen 810.

In the example of the response information display area 803 illustrated in FIG. 7A, it is shown that comment data indicating a comment saying "It's cute" is transmitted from the viewing terminal 2*b* of a viewing user named "user A". In addition, it is shown that evaluation data is transmitted from the viewing terminal 2*b* of a viewing user named "user B". Furthermore, it is shown that a name gift object "bear-san" is selected from the viewing terminal 2*b* of a viewing user named "user C".

The evaluation button 811 is an object image to give instructions for transmitting evaluation data related to the character object 801 included in the character stream screen 810 or the stream user involved in the character object 801. When the input device 24 is a touch panel, upon a tap operation performed by a viewing user on the display area of the evaluation button 811, the evaluation button 811 is selected. The evaluation button 811 may not be displayed in a visually recognizable manner. When the evaluation button 811 is selected by a viewing user who is viewing the character stream screen 810, the transmitter 273 of the viewing terminal 2*b* transmits a display request to the server apparatus 3 via the communication I/F 21, the display request including evaluation data indicating "positive evaluation for the character object 801 included in the character stream screen 810" has been made or evaluation data indicating "positive evaluation for the stream user involved in the character object 801 included in the character stream screen 810" has been made. The server receiver 331 of the server apparatus 3 may store the received evaluation data in the storage device 32, or the server streamer 332 of the server apparatus 3 may transmit the received evaluation data to the stream terminal 2*a*.

Note that the evaluation button 811 may be an object image to give instructions for transmitting a display request including evaluation data indicating "negative evaluation for the character object 801 included in the character stream screen 800" has been made or evaluation data indicating "negative evaluation for the stream user involved in the character object 801 included in the character stream screen 800" has been made. Also, the character stream screen 810 may include multiple types of evaluation buttons 811 (for instance, two types of evaluation buttons: one is for transmitting positive evaluation data, and the other is for transmitting negative evaluation data).

When the character stream screen 810 is displayed on multiple viewing terminals 2b, aggregate information obtained by aggregating evaluation data transmitted from each viewing terminal 2b may be included in the character stream screen 800 and/or the character stream screen 810. For instance, the server apparatus 3 may count the number of pieces of evaluation data transmitted from each of the multiple viewing terminals 2b and may include the number of pieces of evaluation data in the character stream screen 800 and/or the character stream screen 810. The aggregate information is not limited to the number of pieces of evaluation data and may also be, for instance, information on time interval when the evaluation data is transmitted. Note that the period of aggregate is the period from the start of a stream event to the present time, the period from the start of display of the character stream screen 800 to the present time, the period from the start of streaming of the character stream screen 810 to the present time, a predetermined period (for instance, the period from 21:00 to 24:00), or the like. Also, multiple periods of aggregate may be set. When evaluation data is transmitted to the stream terminal 2a by the server apparatus 3, aggregate processing of evaluation data may be performed by the stream terminal 2a. In this case, processing to include aggregate information in the character stream screen 800 may be performed by the stream terminal 2a, and processing to include aggregate information in the character stream screen 810 may be performed by the viewing terminal 2b which displays the character stream screen 810.

The gift button 812 is an object image to give instructions for displaying a selection screen 820 to select a gift object to be displayed on the character stream screen 800 and the character stream screen 810. When the input device 24 is a touch panel, upon a tap operation performed by a viewing user on the display area of the gift button 812, the gift button 812 is selected. The gift button 812 may not be displayed in a visually recognizable manner. When the gift button 812 is selected by a viewing user who is viewing the character stream screen 810, the selection screen 820 is displayed. The details of the selection screen 820 will be described below.

The comment button 813 is an object image to give instructions for displaying a comment input window to input a comment (character string) to be displayed on the character stream screen 800 and the character stream screen 810. When the input device 24 is a touch panel, upon a tap operation performed by a viewing user on the display area of the comment button 813, the comment button 813 is selected. The comment button 813 may not be displayed in a visually recognizable manner. When the comment button 813 is selected by a viewing user who is viewing the character stream screen 810, a comment input window is displayed to be superimposed on the character stream screen 810.

The comment input window is displayed only on the display unit 23 of the viewing terminal 2b of a viewing user who has selected the comment button 813, and the comment input window and a character string being input in the comment input window are not displayed on the display unit 23 of other viewing terminals 2b. The input device 24 is operated by a viewing user, thus the transmitter 273 transmits a display request to the server apparatus 3 via the communication I/F 21, the display request including comment data showing a comment (character string) input in the comment input window.

The server receiver 331 of the server apparatus 3 receives a display request for response information from each viewing terminal 2b during display of the character stream screen 810, and the server streamer 332 of the server apparatus 3 transmits request stream data including the response information to any other viewing terminal 2b other than the viewing terminal 2b which has transmitted the display request. The reproducer 275 of each viewing terminal 2b during display of the character stream screen 810 displays the character stream screen 810, in which the pieces of response information included in the request stream data transmitted from the server apparatus 3 and the pieces of response information transmitted to the server apparatus 3 are arranged in time series and included in the response information display area 814. Also, the server apparatus 3 transmits to the stream terminal 2a the display request for the response information included in the stream data from each viewing terminal 2b, and the reproducer 275 of the stream terminal 2a displays the character stream screen 800 in which the pieces of response information included in the request stream data transmitted from the server apparatus 3 are arranged in time series and included in the response information display area 803.

Note that the server apparatus 3 may generate pieces of character video stream data for displaying the character stream screen 800 and the character stream screen 810 in which the pieces of response information from one or more viewing terminals 2b during display of the character stream screen 810 are arranged in chronological order of transmission and included in the response information display area 803 and the response information display area 814 and may transmit corresponding pieces of character video stream data to the stream terminal 2a and each viewing terminal 2b.

An upper limit number may be set to the number of pieces of response information displayable on the response information display area 803 and the response information display area 814. In the example of the response information display area 803 illustrated in FIG. 7A and the response information display area 814 illustrated in FIG. 7B, the upper limit number of displayable pieces of response information is "3". When the number of pieces of response information to be displayed on each terminal 2 exceeds the upper limit number which has been set, the reproducer 275 of each terminal 2 displays the character stream screen 800 in which newly received three pieces of response information are sequentially included in the response information display area 803. Note that the server apparatus 3 may generate pieces of character video stream data for displaying the character stream screen 800 and the character stream screen 810 in which most recently received three pieces of response information are arranged in chronological order and included in the response information display area 803 and the response information display area 814 and may transmit corresponding pieces of character video stream data to the stream terminal 2a and each viewing terminal 2b.

Note that a publicly-known scroll bar may be displayed adjacent to the response information display area 803 and the response information display area 814. In this case, in response to an operation of the scroll bar performed by a stream user and a viewing user, response information older than the response information displayed adjacent to the response information display area 803 and the response information display area 814 is displayed on the response information display area 803 and the response information display area 814.

Figure 8A:
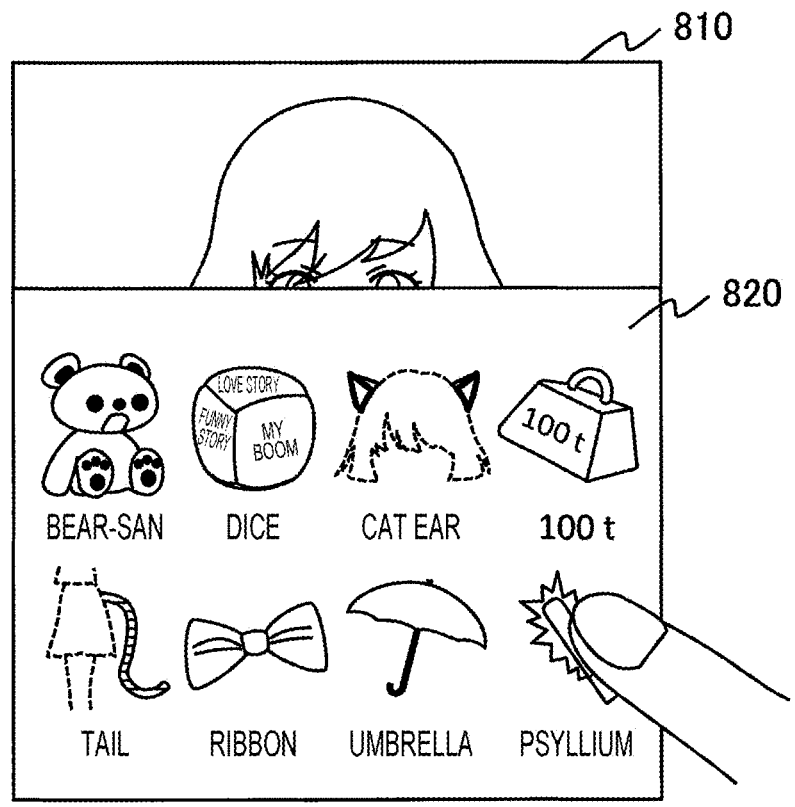
FIGS. 8A and 8B are each a view illustrating an example of a screen displayed on the display unit of the terminal.

FIG. 8A is a view illustrating an example of the selection screen 820 displayed on the display unit 23. The selection screen 820 illustrated in FIG. 8A is displayed by the reproducer 275 of the viewing terminal 2*b* so as to be superimposed on the character stream screen 810. The selection screen 820 may be displayed after the display of the character stream screen 810 ends.

The selection screen 820 includes images and/or names showing one or more candidate objects. In the example illustrated in FIG. 8A, images and names showing eight types of candidate objects are displayed on the selection screen 820. The number of candidate objects displayed on the selection screen 820 is not limited to eight. Note that when it is not possible to include part of the images showing multiple candidate objects in the selection screen 820, the reproducer 275 of the viewing terminal 2 may display a publicly-known scroll bar in the selection screen 820. In this case, in response to an operation of the scroll bar performed by a viewing user, an image showing a candidate object not currently displayed on the selection screen 820 is scroll-displayed in the selection screen 820.

Each of the candidate objects indicates a gift object, and an image showing a candidate object is, for instance, an icon image or a thumbnail image showing a gift object. Note that in the selection screen 820, the images and/or names of the candidate objects may be classified into the types of gift object (such as a free gift, a paid gift, an accessory, support goods, appeal, and variety) and displayed. Note that a gift object belonging to the paid gift (hereinafter, may be referred to as a "paid gift object") is purchasable by a viewing user consuming "coins" having a virtual monetary value. A gift object belonging to the free gift is available by consuming points which are obtainable by, for instance, viewing streaming data instead of consuming a monetary value.

When the input device 24 is a touch panel, in response to a tap operation performed by a viewing user on the display area of an image and/or a name showing a candidate object, the candidate object is selected. When a candidate object is selected by a viewing user, the transmitter 273 of the viewing terminal 2*b* sets information (for instance, an object ID) showing the selected candidate object as gift object information and transmits a display request to the server apparatus 3 via the communication I/F 21, the display request being for displaying a gift object corresponding to the gift object information on the stream screen. A display request for a gift object from the viewing terminal 2*b* is transmitted to the server apparatus 3 in this manner, thus a gift object selected by a viewing user is presented to a stream user or the character object 801 of a stream user, and the presented gift object is displayed as in the character stream screen 800 and the character stream screen 810 illustrated in FIG. 8B and FIG. 9A.

Figure 8B:
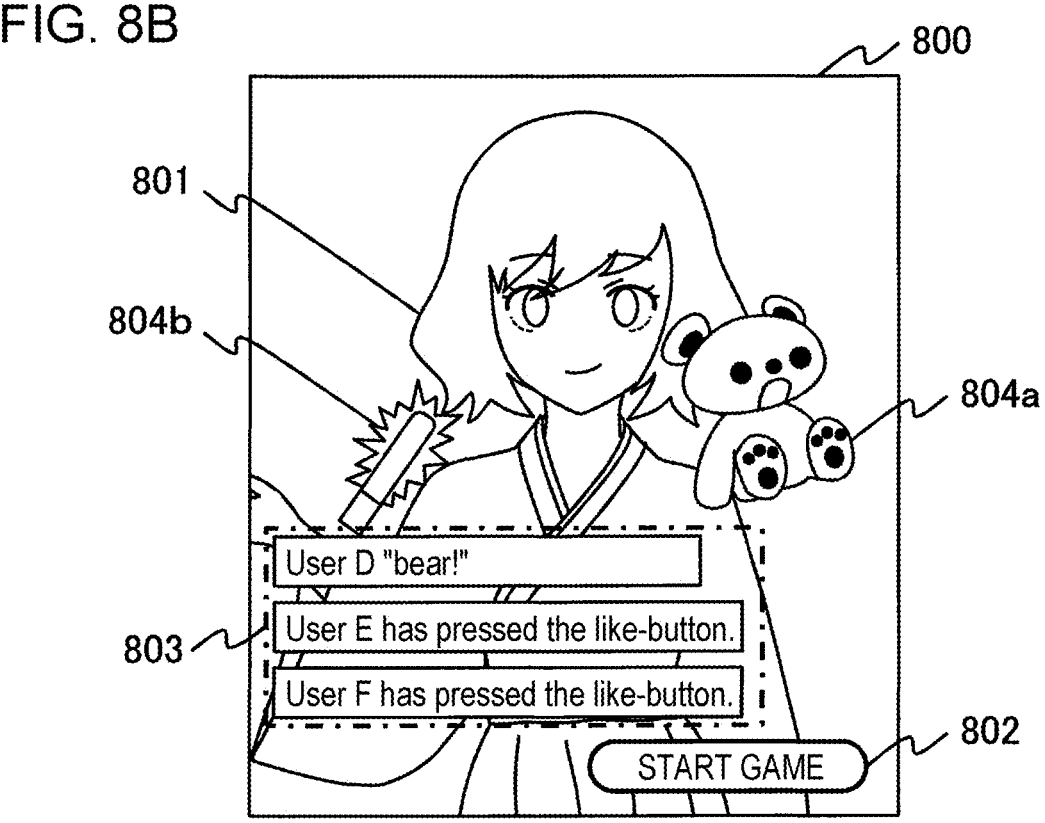
Figure 9A:
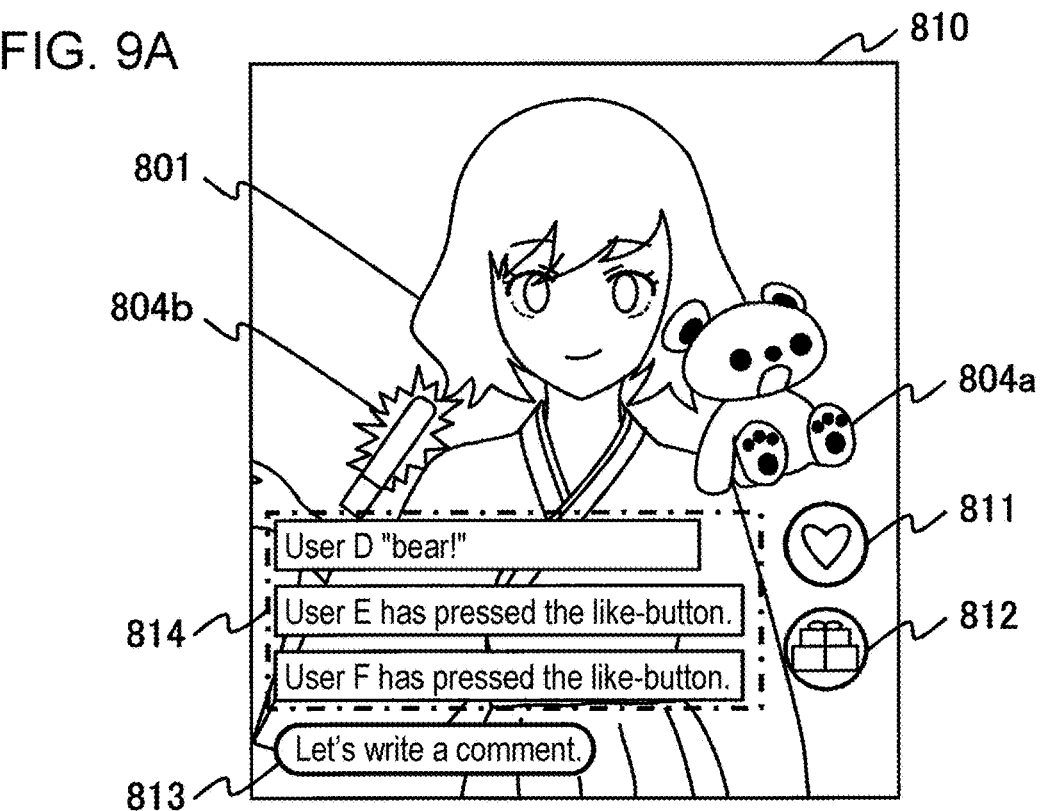
FIGS. 9A and 9B are each a view illustrating an example of a screen displayed on the display unit of the terminal.

FIG. 8B is a view illustrating an example of the character stream screen 800 displayed on the display unit 23 of the stream terminal 2*a* after a display request for a gift object is transmitted. FIG. 9A is a view illustrating an example of the character stream screen 810 displayed on the display unit 23 of the viewing terminal 2*b* after a display request for a gift object is transmitted.

In the same manner as the character stream screen 800 illustrated in FIG. 7A, the character stream screen 800 illustrated in FIG. 8B includes the character object 801, the game start button 802, and the response information display area 803. Furthermore, the character stream screen 800 illustrated in FIG. 8B includes the gift objects 804*a* and 804*b*.

The server receiver 331 of the server apparatus 3 receives via the communication I/F 31 a display request including gift object information (such as an object ID) from each viewing terminal 2*b* during display of the character stream screen 810, and the server streamer 332 transmits request stream data including the received display request to the stream terminal 2*a* via the communication I/F 31. The receiver 274 of the stream terminal 2*a* receives the request stream data from the server apparatus 3 via the communication I/F 21. When the received request stream data includes a display request for a predetermined specific gift object, the receiver 274 identifies the display request included in the received request stream data as the effect instructions. The receiver 274 retrieves the viewing user ID and points included in the identified effect instructions and stores the retrieved viewing user ID, receive date/time, and points of the effect instructions in the effect instruction history table T3 in association with each other as a new record.

The reproducer 275 of the stream terminal 2*a* displays the gift objects 804*a* and 804*b* which are object images corresponding to the gift object information included in the request stream data (the gift object information included in the display request) received by the receiver 274. When the displayed gift object is a predetermined specific gift object, the reproducer 275 deletes from the effect instruction history table T3 the information corresponding to the effect instructions for the displayed gift object (specific gift object) among the information (viewing user ID, receive date/time, and points) on the effect instructions stored in the effect instruction history table T3.

In the same manner as the character stream screen 810 illustrated in FIG. 7B, the character stream screen 810 illustrated in FIG. 9A includes the character object 801, the evaluation button 811, the gift button 812, the comment button 813, and the response information display area 814. Furthermore, the character stream screen 810 illustrated in FIG. 9A includes the same gift objects 804*a* and 804*b* as in FIG. 8B.

When the character stream screen 810 is displayed by any other viewing terminal 2*b* other than the viewing terminal 2*b* which has transmitted the display request, the server receiver 331 of the server apparatus 3 receives the display request including the gift object information from the other viewing terminal 2*b* during display of the character stream screen 810, and the server streamer 332 of the server apparatus 3 transmits request stream data including the received display request to any other viewing terminal 2*b* other than the viewing terminal 2*b* which has transmitted the display request.

The receiver 274 of the other viewing terminal 2*b* receives the request stream data from the server apparatus 3 via the communication I/F 21. When the received request stream data includes a display request for a predetermined specific gift object, the receiver 274 identifies the display request included in the received request stream data as the effect instructions. The receiver 274 retrieves the viewing user ID and points included in the identified effect instructions and stores the retrieved viewing user ID, receive date/time, and points of the effect instructions in the effect instruction history table T3 in association with each other as a new record.

The reproducer 275 of the other viewing terminal 2b displays the gift objects 804c and 804d which are object images corresponding to the gift object information included in the request stream data (the gift object information included in the display request) received by the receiver 274. When the displayed gift object is a predetermined specific gift object, the reproducer 275 deletes from the effect instruction history table T3 the information corresponding to the effect instructions for the displayed gift object (specific gift object) among the information (viewing user ID, receive date/time, and points) corresponding to the effect instructions stored in the effect instruction history table T3.

When the character stream screen 810 is displayed by the viewing terminal 2b which has transmitted a display request, the viewing terminal 2b displays the gift objects 804c and 804d which are object images corresponding to the information showing the candidate objects selected by the viewing user who operates the viewing terminal 2b.

The gift objects 804c and 804d displayed on the character stream screen 800 and the character stream screen 810 may be displayed on the stream screens 800 and 810 for respective predetermined display times (for instance, 10 seconds and 15 seconds). Alternatively, on the character stream screen 800 and the character stream screen 810, the gift objects 804c and 804d, which move along respective predetermined movement routes, may be displayed.

Figure 9B:
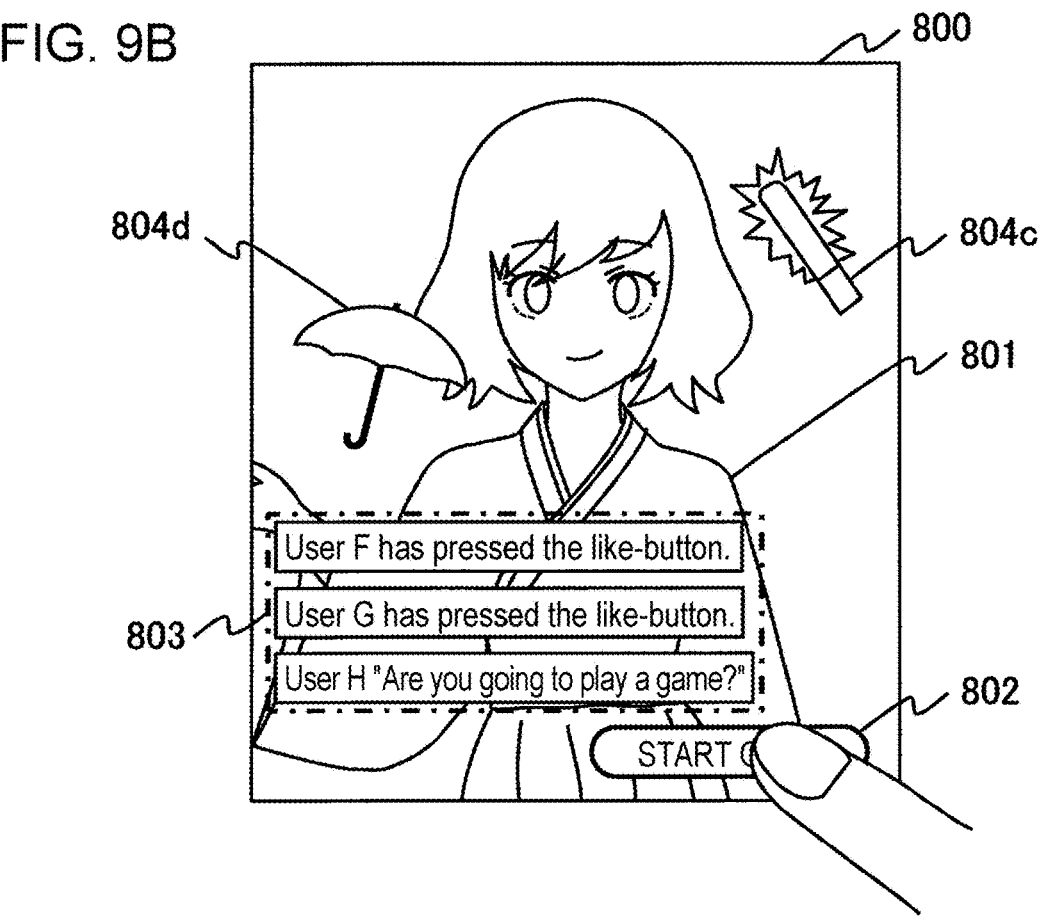

FIG. 9B is a view illustrating another example of the character stream screen 800 displayed on the display unit 23 of the stream terminal 2a. In the same manner as the character stream screen 800 illustrated in FIG. 7A, the character stream screen 800 illustrated in FIG. 9B includes the character object 801, the game start button 802, and the response information display area 803.

When the input device 24 is a touch panel as in the character stream screen 800 illustrated in FIG. 9B, upon a tap operation performed by a stream user on the display area of the game start button 802, the game start button 802 is selected. When the game start button 802 is selected by a stream user, the input device 24 notifies the executor 272 of instructions for executing a game. When receiving instructions for executing a game from the input device 24, the executor 272 starts the game which is implemented by executing various commands contained in the control program (game program) stored in the storage device 22 and displays a first game stream screen including the screen of the started game on the display unit 23. A fishing game, which is implemented by executing various commands contained in the control program (game program), will be described as an example.

Figure 10A:
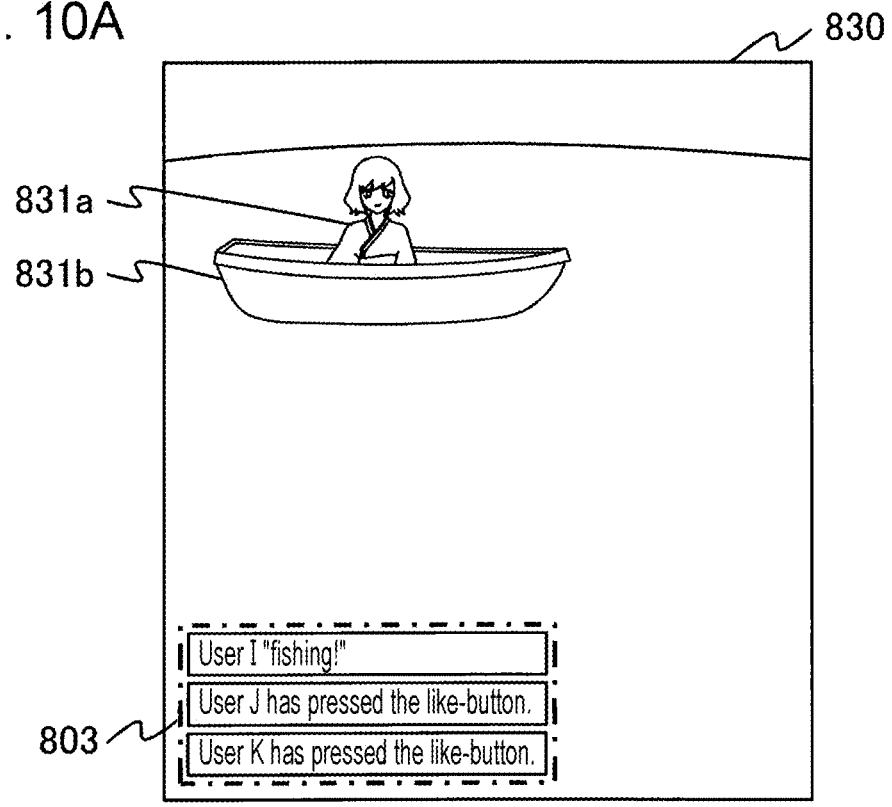
FIGS. 10A and 10B are each a view illustrating an example of a screen displayed on the display unit of the terminal.
Figure 10B:
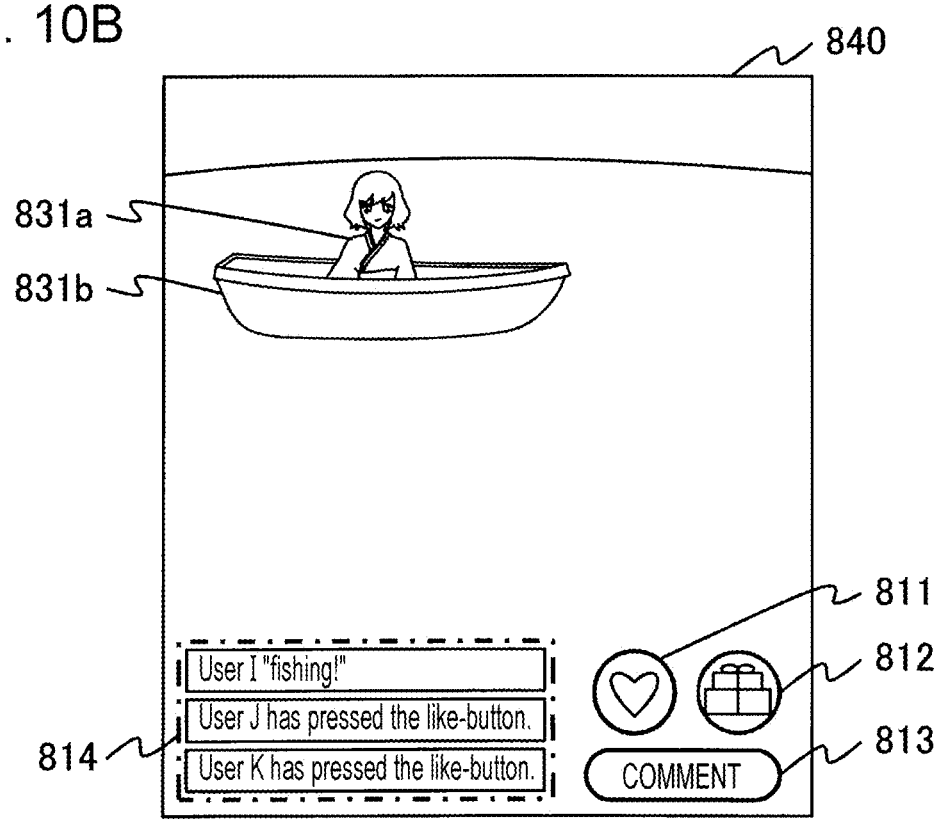

FIG. 10A is a view illustrating an example of a first game stream screen 830 displayed on the display unit 23 of the stream terminal 2a. The first game stream screen 830 includes a character object 831a, a transportation object 831b, and a response information display area 803. FIG. 10B is a view illustrating an example of a first game stream screen 840 displayed on the display unit 23 of the viewing terminal 2b. The first game stream screen 840 includes a character object 831a, a transportation object 831b, an evaluation button 811, a gift button 812, a comment button 813, and a response information display area 814.

As illustrated in FIG. 10A, the executor 272 of the stream terminal 2 executes various commands contained in the control program (game program) to start a fishing game, and then displays the first game stream screen 830 including the screen of the first game. At the same time, the transmitter 273 of the stream terminal 2 transmits game video data to the server apparatus 3 via the communication I/F 21, the game video data being for displaying a video on the screen of the first game currently displayed.

When the server receiver 331 of the server apparatus 3 receives via the communication I/F 31 the game video data transmitted from the stream terminal 2a, the server streamer 332 of the server apparatus 3 transmits game video stream data to one or more viewing terminals 2b via the communication I/F 31, the game video stream data being contained in the game video data and including a video on the game screen of the first game being executed.

When the receiver 274 of each viewing terminal 2b receives the game video stream data from the server apparatus 3 via the communication I/F 21, the reproducer 275 of the viewing terminal 2b displays the first game stream screen 840 (FIG. 10B) based on the received video stream data.

The character object 831a is an object image showing the character object 801. In the same manner as the character object 801, the character object 831a may be generated based on the motion data of the stream user so as to digitally represent the motion of the face (change in the facial expression) of a stream user, the motion of the eyes, or the motion of the body in time series. In addition, the character object 831a may also be a still image of a character object. Also, the character object 831a may be a profile image (still image) which is placed on the top screen of a user in a website related to the video stream system.

The transportation object 831b is an object image arranged at a predetermined position in the first game stream screen 830 and the first game stream screen 840, the object image representing a boat and being displayed to float on the water surface. The transportation object 831b may also be an object which moves in a predetermined direction or along a predetermined movement route. The transportation object 831b may also be an object image representing a transportation other than a boat, and may not be displayed on the first game stream screen 830 and the first game stream screen 840.

The response information display area 803 included in the first game stream screen 830 illustrated in FIG. 10A has the same function as that of the response information display area 803 included in the character stream screen 800. The evaluation button 811, the gift button 812, the comment button 813, and the response information display area 814 included in the first game stream screen 840 illustrated in FIG. 10B have the same functions as those of the evaluation button 811, the gift button 812, the comment button 813, and the response information display area 814 included in the character stream screen 810.

The evaluation button 811 illustrated in FIG. 10B is an object image to give instructions for transmitting evaluation data on the gameplay of a stream user in the first game stream screen 840. In addition, the gift button 812 illustrated in FIG. 10B is an object image to give instructions for displaying the selection screen 820 to select a gift object. When the gift button 812 is selected by a viewing user who is viewing the first game stream screen 840, the selection screen 820 is displayed. In response to a tap operation performed by a viewing user on the display area of an image and/or a name showing a candidate object in the selection screen 820 displayed, the candidate object is selected. When a candidate object is selected by a viewing user, the transmitter 273 of the viewing terminal 2b sets information (for instance, an object ID) showing the selected candidate object as gift object information, and transmits a display request to the server apparatus 3 via the communication I/F 21, the display request for displaying a gift object corresponding to the gift object information on the stream screen. The comment button 813 illustrated in FIG. 10B is an object image to give instructions for displaying a comment input window to input a comment (character string) to be displayed on the first game stream screen 830 and the first game stream screen 840.

Figure 11A:
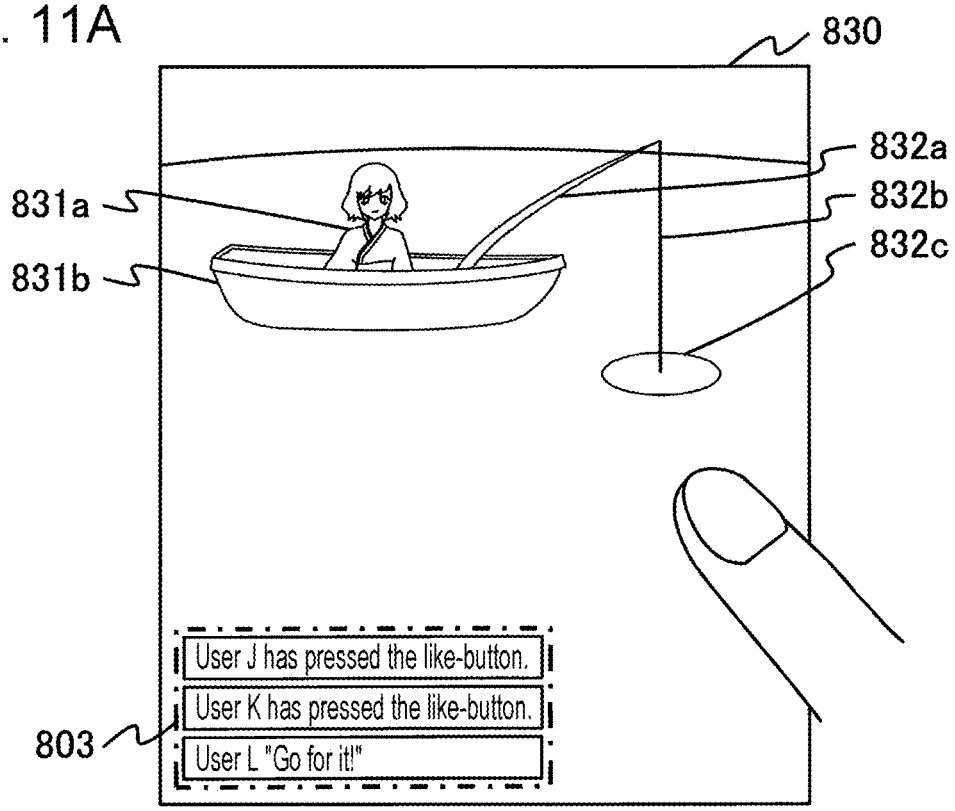
FIGS. 11A and 11B are each a view illustrating an example of a screen displayed on the display unit of the terminal.

FIG. 11A is a view illustrating another example of the first game stream screen 830 displayed on the display unit 23 of the stream terminal 2a. In the same manner as the first game stream screen 830 illustrated in FIG. 10A, the first game stream screen 830 illustrated in FIG. 11A includes the character object 831a, the transportation object 831b, and the response information display area 803. The response information display area 803 illustrated in FIG. 11A has the same function as that of the response information display area 803 illustrated in FIG. 10A.

When the input device 24 is a touch panel as in the first game stream screen 830 illustrated in FIG. 11A, upon a tap operation performed by a stream user on a predetermined display area in the first game stream screen 830, the input device 24 notifies the executor 272 of instructions for starting progress of the first game. The predetermined display area may also be, for instance, the entire display area of the first game stream screen 830, or may be a partial area of the first game stream screen 830 (for instance, a partial area of the entire display area of the first game stream screen 830 excluding the outer margin area).

When receiving instructions for starting progress of the first game from the input device 24, the executor 272 displays a fishing rod object 832a which is placed to extend from the boat object 831b, a fishing line object 832b which is placed to extend from the fishing rod object 832a to the water surface, and a mark object 832c on the first game stream screen 830. The fishing rod object 832a and the fishing line object 832b are object images representing a fishing rod and a fishing line, respectively, and the mark object 832c is an object image showing the point where the fishing line reaches the water surface.

At the same time when the first game stream screen 830 is displayed by the executor 272, the transmitter 273 of the stream terminal 2a transmits game video data to the server apparatus 3 via the communication I/F 21, the game video data being for displaying a video on the screen of the first game currently displayed. When the server receiver 331 of the server apparatus 3 receives the game video data transmitted from the stream terminal 2a via the communication I/F 31, the server streamer 332 of the server apparatus 3 transmits game video stream data to one or more viewing terminals 2b via the communication I/F 31, the game video stream data being contained in the game video data and including a video on the game screen of the first game being executed. When the receiver 274 of each viewing terminal 2b receives the game video stream data from the server apparatus 3 via the communication I/F 21, the reproducer 275 of the viewing terminal 2b displays the first game stream screen 840 (FIG. 11B) based on the received video stream data.

Figure 11B:
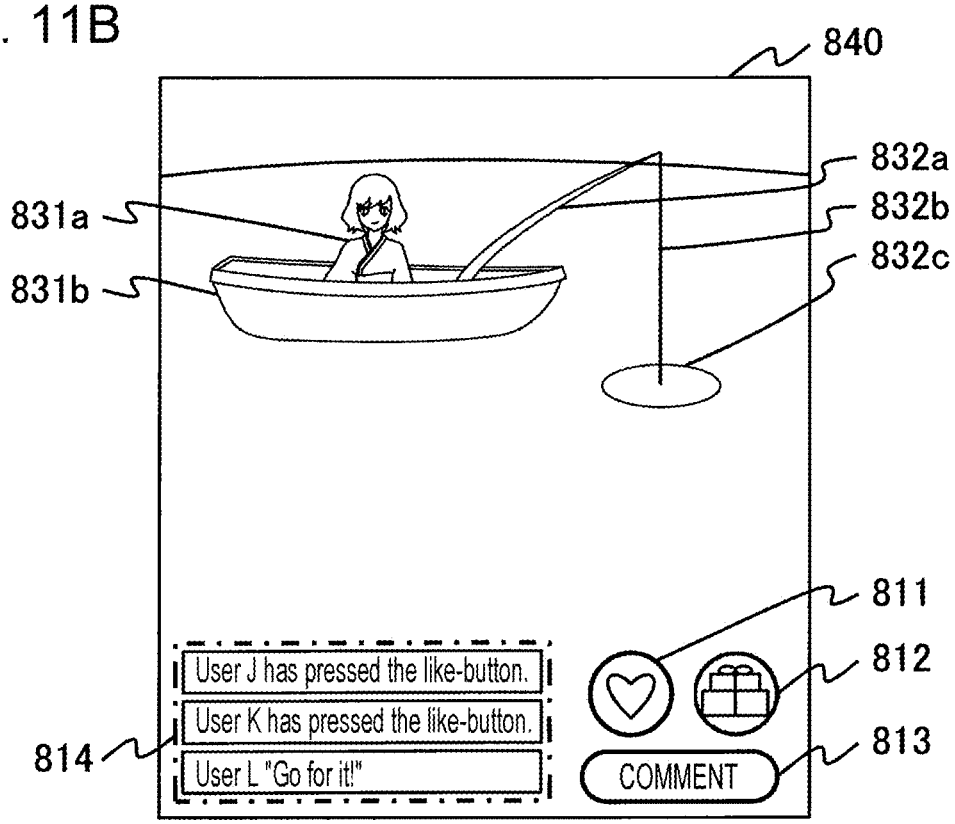

FIG. 11B is a view illustrating another example of the first game stream screen 840 displayed on the display unit 23 of the viewing terminal 2b. The first game stream screen 840 includes the character object 831a, the transportation object 831b, the fishing rod object 832a, the fishing line object 832b, the mark object 832c, the evaluation button 811, the gift button 812, the comment button 813, and the response information display area 814. The evaluation button 811, the gift button 812, the comment button 813, and the response information display area 814 illustrated in FIG. 11B have the same functions as those of the evaluation button 811, the gift button 812, the comment button 813, and the response information display area 814 illustrated in FIG. 10B.

When the progress of the first game starts, the executor 272 of the stream terminal 2a retrieves information showing a first game period (for instance, 10 seconds) pre-stored in the storage device 22. For instance, the executor 272 may use a pseudo-random number generated from the current clock counter value of the stream terminal 2a serving as a seed to select an integer value at random with equal probability from the integer values in a predetermined numerical value range (for instance, 5 seconds or greater and 15 seconds or less), and may set a first game period to the integer value. When determining that the first game period has elapsed, the executor 272 ends the first game and starts the second game. The executor 272 of the stream terminal 2a ends the display of the first game stream screen 830 along with the end of the first game, and displays the second game stream screen 850 on the display unit 23 of the stream terminal 2a.

Figure 12A:
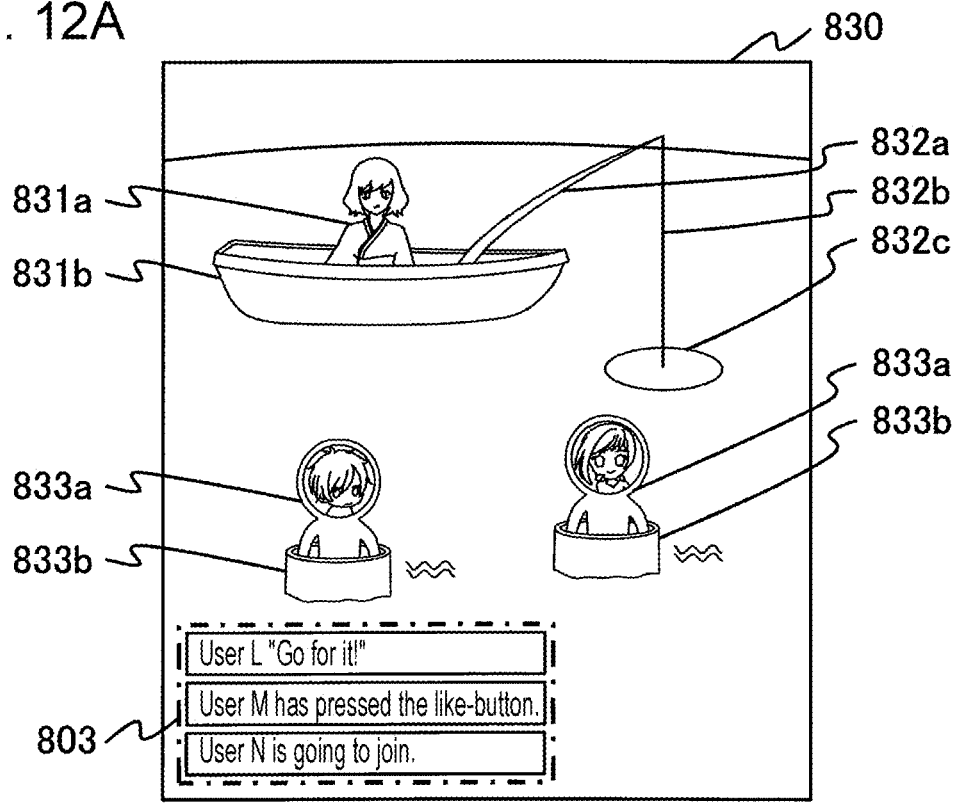
FIGS. 12A and 12B are each a view illustrating an example of a screen displayed on the display unit of the terminal.

FIG. 12A is a view illustrating another example of the first game stream screen 830 displayed on the display unit 23 of the stream terminal 2a. In the same manner as the first game stream screen 830 illustrated in FIG. 11A, the first game stream screen 830 illustrated in FIG. 12A includes the character object 831a, the transportation object 831b, the fishing rod object 832a, the fishing line object 832b, the mark object 832c, and the response information display area 803. The response information display area 803 illustrated in FIG. 12A has the same function as that of the response information display area 803 illustrated in FIG. 11A.

During the progress of the first game, the reproducer 275 of the stream terminal 2a retrieves information (viewing user ID, receive date/time, and points) on the oldest effect instructions stored in the effect instruction history table T3 for every predetermined time interval (for instance, for every one second). The reproducer 275 retrieves the model ID of a character object in association with the retrieved viewing user ID, from the user table T1. The reproducer 275 reads model data in association with the retrieved model ID from the storage device 22. The reproducer 275 then generates a character object 833a based on the read model data, and displays the generated character object 833a, and a transportation object 833b ridden by the character object 833a. In the example illustrated in FIG. 12A, the character object 833a is formed by the face image of a character object showing a viewing user, and a body object showing the body (in the example illustrated in FIG. 12A, the body object is an object image representing a diver suit) based on the model data corresponding to the viewing user. In addition to the face image, the character object 833a may include the parts, other than the face, of the character object showing a viewing user. Thus, the reproducer 275 can display the character objects indicating viewing users who have given effect instructions in the order of input of the effect instructions.

The transportation object 833b is an object image which represents a "pail" and is displayed to float and move in a predetermined direction or along a predetermined movement route on the water surface in the first game stream screen 830. The transportation object 831b may also be an object image representing a transportation other than "pail", and may not be displayed on the first game stream screen 830. In the example illustrated in FIG. 12A, the character object 833a and the transportation object 833b are displayed in the vicinity of the right side of the first game stream screen 830, then are moved in the left direction, and disappear in the vicinity of the left side of the first game stream screen 830.

When the character object 833a is displayed, the reproducer 275 deletes from the effect instruction history table T3 the information corresponding to the effect instructions (the oldest effect instructions) for the displayed character object 833a among the information (viewing user ID, receive date/time, and points) corresponding to the effect instructions stored in the effect instruction history table T3.

For display of the character object 833a and the transportation object 833b, the executor 272 of the stream terminal 2a produces the first game effect corresponding to the displayed character object 833a and/or transportation object 833b.

The first game effect is, for instance, the effect of reducing the first game period (the execution time of the first game). For instance, when the first game period is 10 seconds, and the time by which the period is reduced is 0.2 seconds, with display of five character objects 833a, the executor 272 reduces the first game period from 10 seconds to nine seconds. The first game effect may be an effect of extending the first game period (the execution time of the first game). Note that when the first game effect is an effect of reducing the first game period (the execution time of the first game), the reproducer 275 may control the display of the character object 833a so that the character object 833a automatically performs a predetermined action (for instance, an action of "scattering bait") once.

The time of occurrence of the first game is when the character object 833a and/or the transportation object 833b make appearance (are displayed for the first time), when display of the character object 833a and/or the transportation object 833b ends, or a predetermined time point in the display period of the character object 833a and/or the transportation object 833b.

Figure 12B:
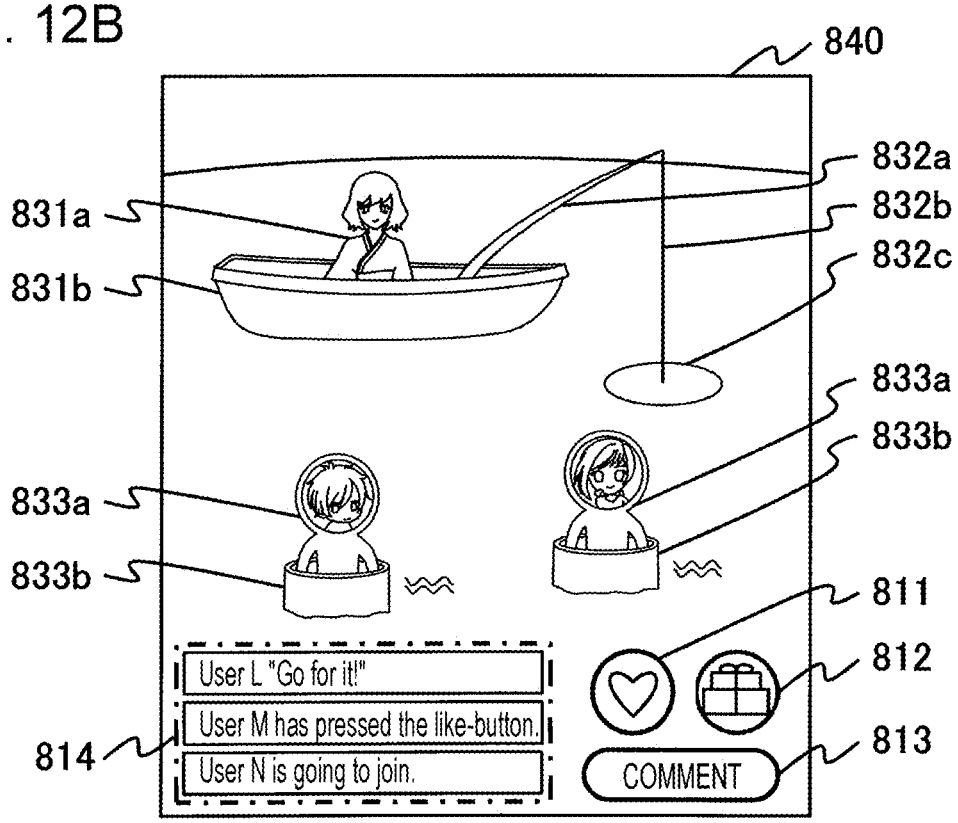

FIG. 12B is a view illustrating another example of the first game stream screen 840 displayed on the display unit 23 of the viewing terminal 2b. In the same manner as the first game stream screen 840 illustrated in FIG. 11B, the first game stream screen 840 illustrated in FIG. 12B includes the character object 831a, the transportation object 831b, the fishing rod object 832a, the fishing line object 832b, the mark object 832c, the evaluation button 811, the gift button 812, the comment button 813, and the response information display area 814. The evaluation button 811, the gift button 812, the comment button 813, and the response information display area 814 illustrated in FIG. 12B have the same functions as those of the evaluation button 811, the gift button 812, the comment button 813, and the response information display area 814 illustrated in FIG. 11B.

In the same manner as the reproducer 275 of the stream terminal 2a, the reproducer 275 of the viewing terminal 2b performs processing to display the character object 833a and the transportation object 833b, and performs processing to delete information in the effect instruction history table T3. In the same manner as the executor 272 of the stream terminal 2a, for display of the character object 833a and the transportation object 833b, the executor 272 of the viewing terminal 2b produces the first game effect corresponding to the displayed character object 833a and/or transportation object 833b.

Figure 13A:
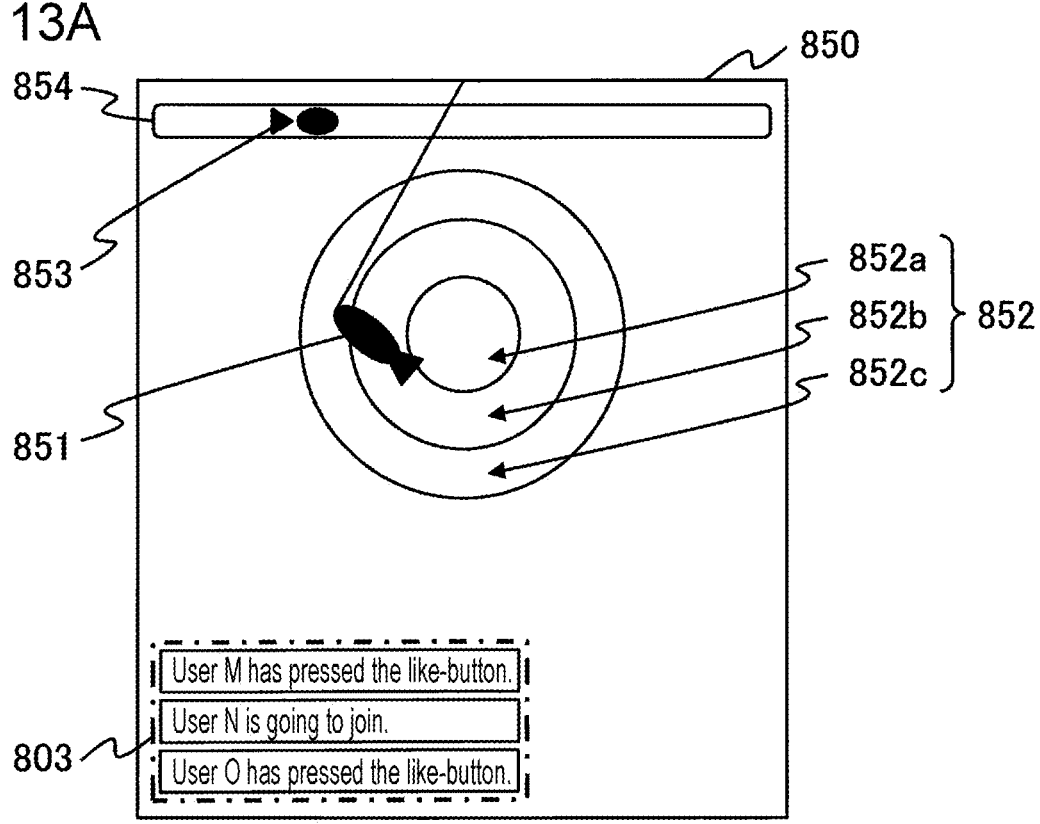
FIGS. 13A and 13B are each a view illustrating an example of a screen displayed on the display unit of the terminal.

FIG. 13A is a view illustrating an example of the second game stream screen 850 displayed on the display unit 23 of the stream terminal 2a. The second game stream screen 850 includes a game object 851, a target object 852, a parameter cursor 853, a parameter gauge frame 854, and the response information display area 803. The response information display area 803 included in the second game stream screen 850 illustrated in FIG. 13A has the same function as that of the response information display area 803 included in the character stream screen 800.

The game object 851 is an object image representing fish, and is controlled and moved automatically along a predetermined path or a randomly determined path in the second game stream screen 850. Note that an initial value is stored in the storage device 22 in association with the game object 851, and the executor 272 sets an initial value in association with the game object 851 as the parameter value of the game object 851 at the start of the second game.

The target object 852 includes a first target object 852a, a second target object 852b and a third target object 852c. The first target object 852a is an object image having a substantially circular shape, the second target object 852b is an object image having a shape to surround the circumference of the first target object 852a, and the third target object 852c is an object image having a shape to surround the circumference of the second target object 852b.

When the input device 24 is a touch panel, upon a tap operation performed by a stream user on a predetermined display area in the second game stream screen 850, the input device 24 notifies the executor 272 of game input instructions. When the game input instructions are obtained from the input device 24, the executor 272 of the stream terminal 2a determines in which one of the first target object 852a, the second target object 852b and the third target object 852c, a predetermined position (for instance, a position corresponding to the mouth of fish) of the game object 851 is located.

When determining in which one of the first target object 852a, the second target object 852b and the third target object 852c, a predetermined position of the game object 851 is located, the executor 272 changes (increases or decreases) the parameter value of the game object 851.

The executor 272 changes the amount of change in the parameter value of the game object 851 according to the location of the predetermined position of the game object 851 when the game input instructions are obtained from the input device 24.

When a predetermined position of the game object 851 is located at the first target object 852a at the time of obtaining the game input instructions, the executor 272 decreases the parameter value of the game object 851 by a first decrement value. Note that in this case, the executor 272 may increase the parameter value of the game object 851 by a first increment value.

When a predetermined position of the game object 851 is located at the second target object 852b at the time of obtaining the game input instructions, the executor 272 decreases the parameter value of the game object 851 by a second decrement value smaller than the first decrement value. Note that in this case, the executor 272 may increase the parameter value of the game object 851 by a second increment value smaller than the first increment value.

When a predetermined position of the game object 851 is located at the third target object 852c at the time of obtaining the game input instructions, the executor 272 decreases the parameter value of the game object 851 by a third decrement value smaller than the second decrement value. Note that in this case, the executor 272 may increase the parameter value of the game object 851 by a third increment value smaller than the second increment value.

When a predetermined position of the game object 851 is located outside the target object 852 at the time of obtaining the game input instructions, the executor 272 does not change the parameter value of the game object 851.

The parameter cursor 853 is a cursor object showing the parameter value of the game object 851. The executor 272 places the parameter cursor 853 at a position in the parameter gauge frame 854, the position corresponding to the parameter value of the game object 851. In the example illustrated in FIG. 13A, the parameter cursor 853 is movable in the parameter gauge frame 854 horizontally, and for a larger parameter value of the game object 851, the parameter cursor 853 is placed at a more rightward position in the parameter gauge frame 854.

When the parameter value of the game object 851 reaches a predetermined value (for instance, "0" (zero)) or less, the executor 272 determines that the viewing user has successfully played the second game, and ends the second game. The executor 272 may determine that the viewing user has successfully played the second game when the parameter value of the game object 851 reaches a predetermined value (a value larger than the parameter value at the time of the start of the second game) or greater. The executor 272 may continue the second game until the second game is successfully played, or may terminate the second game when a predetermined second game period (for instance, 30 seconds) has elapsed since the start of the second game regardless of whether or not the second game has been successfully played.

At the same time when the second game stream screen 850 is displayed by the executor 272, the transmitter 273 of the stream terminal 2a transmits game video data to the server apparatus 3 via the communication I/F 21, the game video data being for displaying a video on the screen of the second game currently displayed. When the server receiver 331 of the server apparatus 3 receives the game video data transmitted from the stream terminal 2a via the communication I/F 31, the server streamer 332 of the server apparatus 3 transmits game video stream data to one or more viewing terminals 2b via the communication I/F 31, the game video stream data being contained in the game video data and including a video on the game screen of the second game being executed. When the receiver 274 of each viewing terminal 2b receives the game video stream data from the server apparatus 3 via the communication I/F 21, the reproducer 275 of the viewing terminal 2b displays the second game stream screen 860 (FIG. 13B) based on the received video stream data.

Figure 13B:
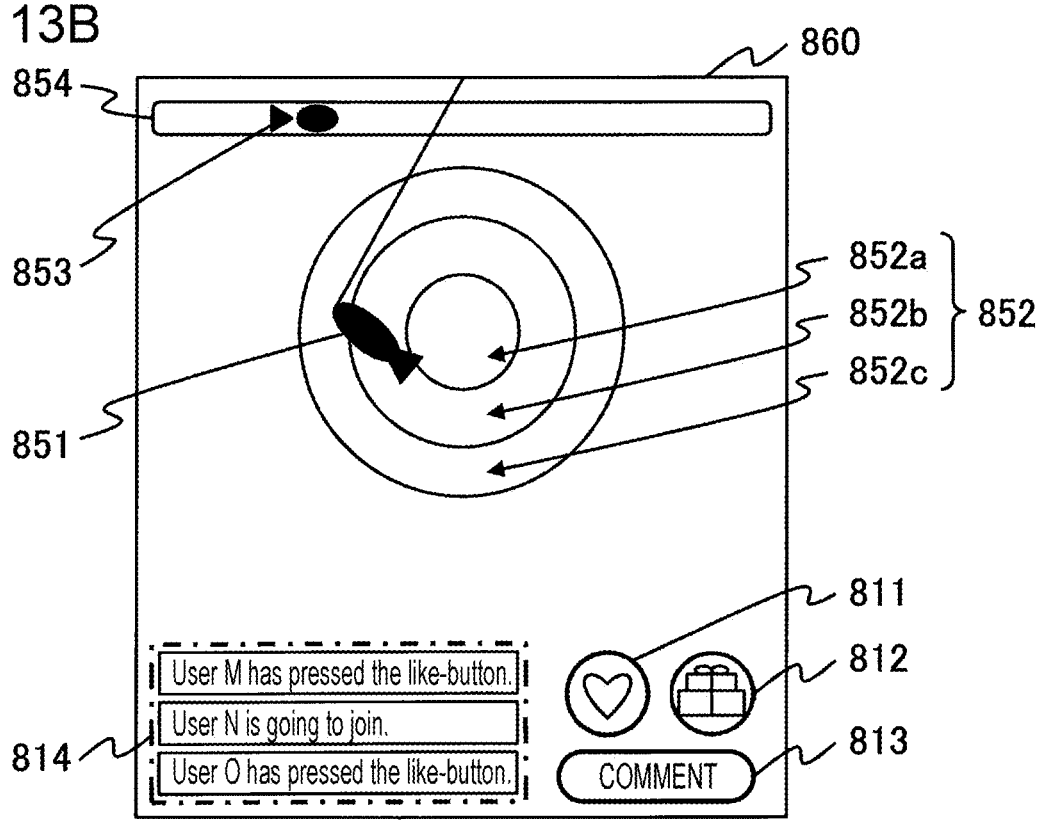

FIG. 13B is a view illustrating an example of the second game stream screen 860 displayed on the display unit 23 of the viewing terminal 2b. The second game stream screen 860 includes the game object 851, the target object 852, the parameter cursor 853, the parameter gauge frame 854, the evaluation button 811, the gift button 812, the comment button 813, and the response information display area 814. The evaluation button 811, the gift button 812, the comment button 813, and the response information display area 814 illustrated in FIG. 13B have the same functions as those of the evaluation button 811, the gift button 812, the comment button 813, and the response information display area 814 illustrated in FIG. 10B.

The evaluation button 811 illustrated in FIG. 13B is an object image to give instructions for transmitting evaluation data on the gameplay of a stream user in the second game stream screen 860. The gift button 812 illustrated in FIG. 13B is an object image to give instructions for displaying the selection screen 820 to select a gift object. The comment button 813 illustrated in FIG. 13B is an object image to give instructions for displaying a comment input window to input a comment (character string) to be displayed on the second game stream screen 850 and the second game stream screen 860.

Figure 14A:
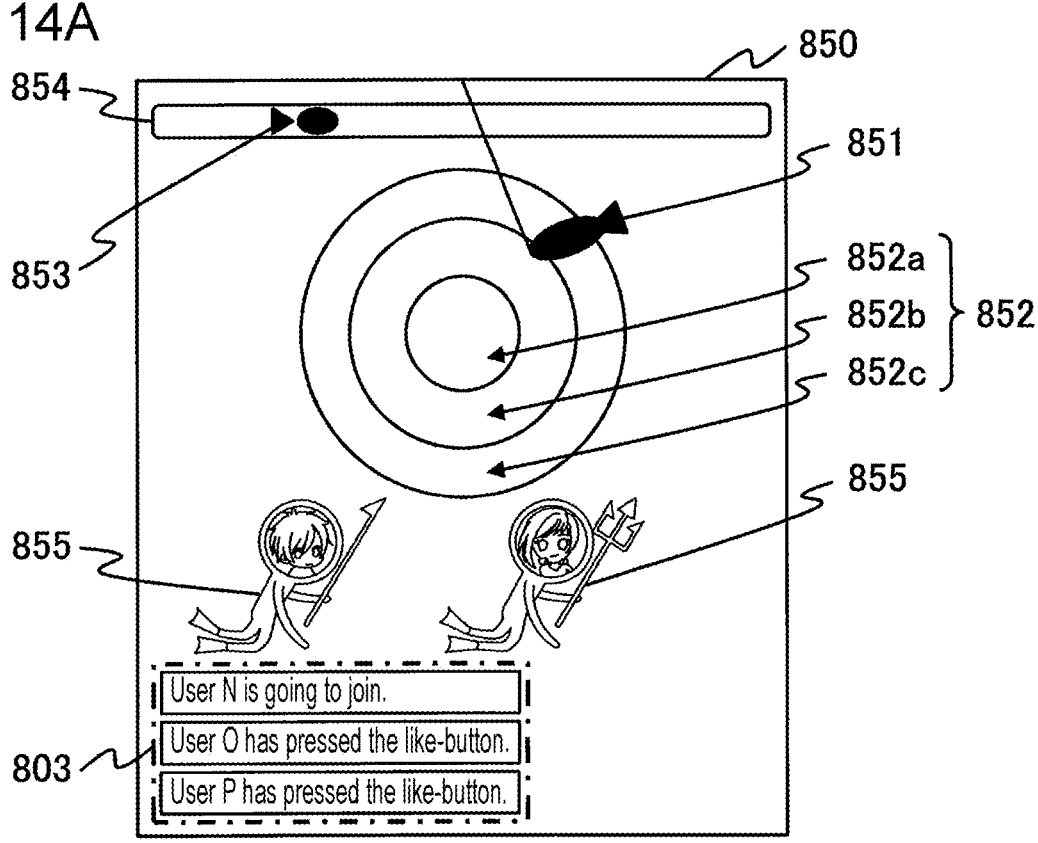
FIGS. 14A and 14B are each a view illustrating an example of a screen displayed on the display unit of the terminal.

FIG. 14A is a view illustrating another example of the second game stream screen 850 displayed on the display unit 23 of the stream terminal 2a. In the same manner as the second game stream screen 850 illustrated in FIG. 13A, the second game stream screen 850 illustrated in FIG. 14A includes the game object 851, the target object 852, the parameter cursor 853, the parameter gauge frame 854, and the response information display area 803. The response information display area 803 illustrated in FIG. 14A has the function same as that of the response information display area 803 illustrated in FIG. 13A.

During the progress of the second game, the reproducer 275 of the stream terminal 2a retrieves information (viewing user ID, receive date/time, and points) on the oldest effect instructions stored in the effect instruction history table T3 for every predetermined time interval (for instance, for every one second). The reproducer 275 retrieves the model ID of a character object in association with the retrieved viewing user ID, from the user table T1. The reproducer 275 reads model data in association with the retrieved model ID from the storage device 22. The reproducer 275 then generates character object 855 based on the read model data, and displays the generated character object 855.

In the example illustrated in FIG. 14A, the character object 855 is formed by the face image of the character object showing the viewing user, and the body object showing the body (in the example illustrated in FIG. 14A, the body object is an object image representing a diver suit) based on the model data corresponding to the viewing user. In addition to the face image, the character object 855 may include parts, other than the face, of the character object showing the viewing user. Thus, the reproducer 275 can display the character objects indicating viewing users who have given effect instructions in the order of input of the effect instructions. In the example illustrated in FIG. 14A, the character object 855 is displayed in the vicinity of the left side of the second game stream screen 850, then is moved in the right direction, and disappears in the vicinity of the right side of the second game stream screen 850.

When the character object 855 is displayed, the reproducer 275 deletes from the effect instruction history table T3 the information corresponding to the effect instructions (the oldest effect instructions) for the displayed character object 833a among the information (viewing user ID, receive date/time, and points) corresponding to the effect instructions stored in the effect instruction history table T3.

For display of the character object 855, the executor 272 of the stream terminal 2a produces the second game effect corresponding to the displayed character object 855.

The second game effect is, for instance, the effect of changing (increasing or decreasing) the parameter value of the game object 851. For instance, the game executor 272 changes the parameter value of the game object 851 during display of the game object 851. The amount of change in the parameter value in the second game effect may be a random value or a constant value. Alternatively, amount of change in the parameter value in the second game effect may be a value according to a predetermined parameter related to a stream user who has given effect instructions for causing the game object 851 to appear. When the second game effect is an effect of changing the parameter value of the game object 851, the reproducer 275 may control the display of the character object 851 so that the character object 851 automatically performs a predetermined action (for instance, an action of moving in a direction toward the target object 852 and returning to the original position) once.

The time of occurrence of the second game is when the character object 855 makes appearance (is displayed for the first time), when display of the character object 855 ends, or a predetermined time point in the display period of the character object 855.

Figure 14B:
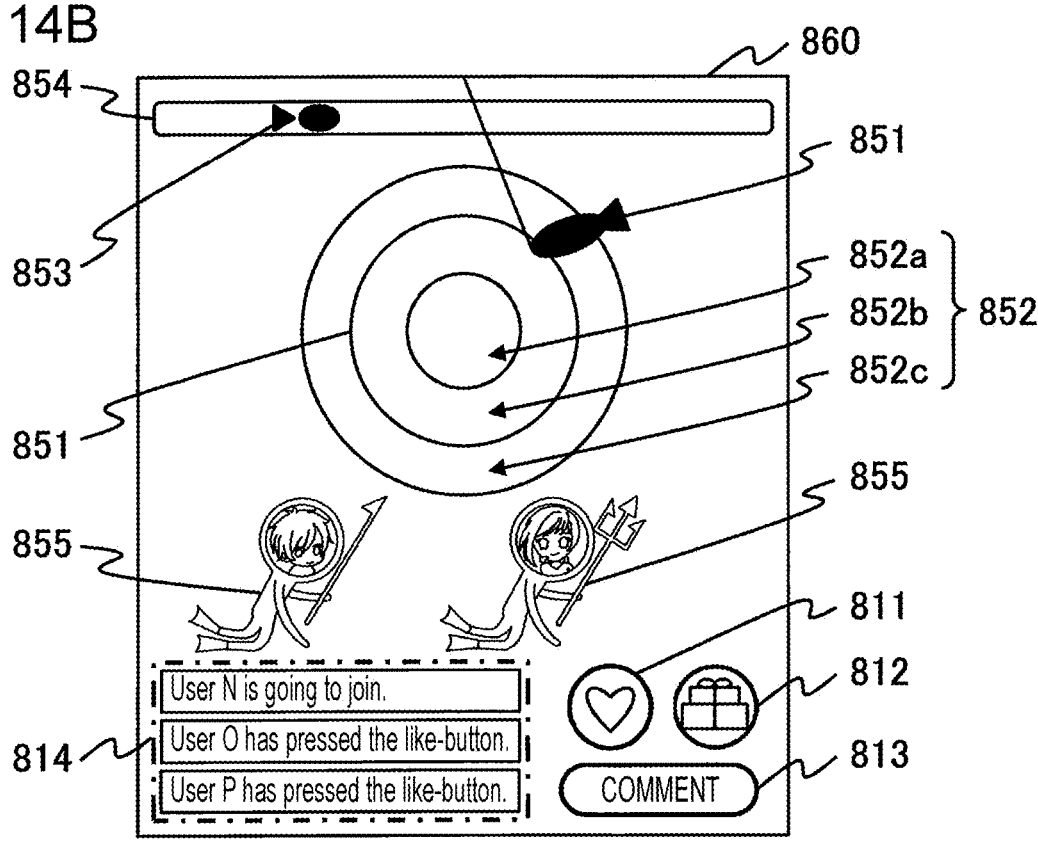

FIG. 14B is a view illustrating another example of the second game stream screen 860 displayed on the display unit 23 of the viewing terminal 2b. In the same manner as the second game stream screen 860 illustrated in FIG. 13B, the second game stream screen 860 illustrated in FIG. 14B includes the game object 851, the target object 852, the parameter cursor 853, the parameter gauge frame 854, the evaluation button 811, the gift button 812, the comment button 813, and the response information display area 814. The evaluation button 811, the gift button 812, the comment button 813, and the response information display area 814 illustrated in FIG. 14B have the same functions as those of the evaluation button 811, the gift button 812, the comment button 813, and the response information display area 814 illustrated in FIG. 13B.

In the same manner as the reproducer 275 of the stream terminal 2a, the reproducer 275 of the viewing terminal 2b performs processing to display the character object 855, and performs processing to delete information in the effect instruction history table T3. In the same manner as the executor 272 of the stream terminal 2a, for display of the character object 855, the executor 272 of the viewing terminal 2b produces the second game effect corresponding to the displayed character object 855.

Figure 15A:
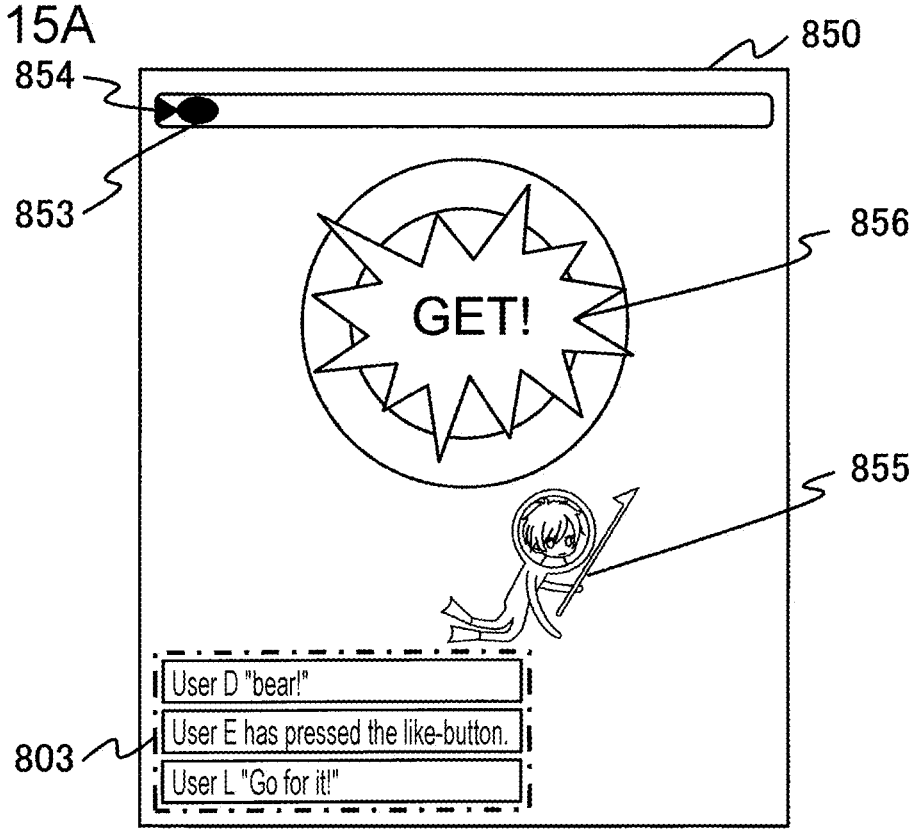
FIGS. 15A and 15B are each a view illustrating an example of a screen displayed on the display unit of the terminal.

FIG. 15A is a view illustrating another example of the second game stream screen 850 displayed on the display unit 23 of the stream terminal 2a. When it is determined that a viewing user has successfully played the second game, the executor 272 displays on the display unit 23 the second game stream screen 850 in which the parameter cursor 853 is placed at the leftmost position in the parameter gauge frame 854 and a game success image 856 is included. After a predetermined time has elapsed since the display of the second game stream screen 850 including the game success image 856, the executor 272 of the stream terminal 2a, ends the display of the second game stream screen 850, and displays a game result screen 870 on the display unit 23.

Figure 15B:
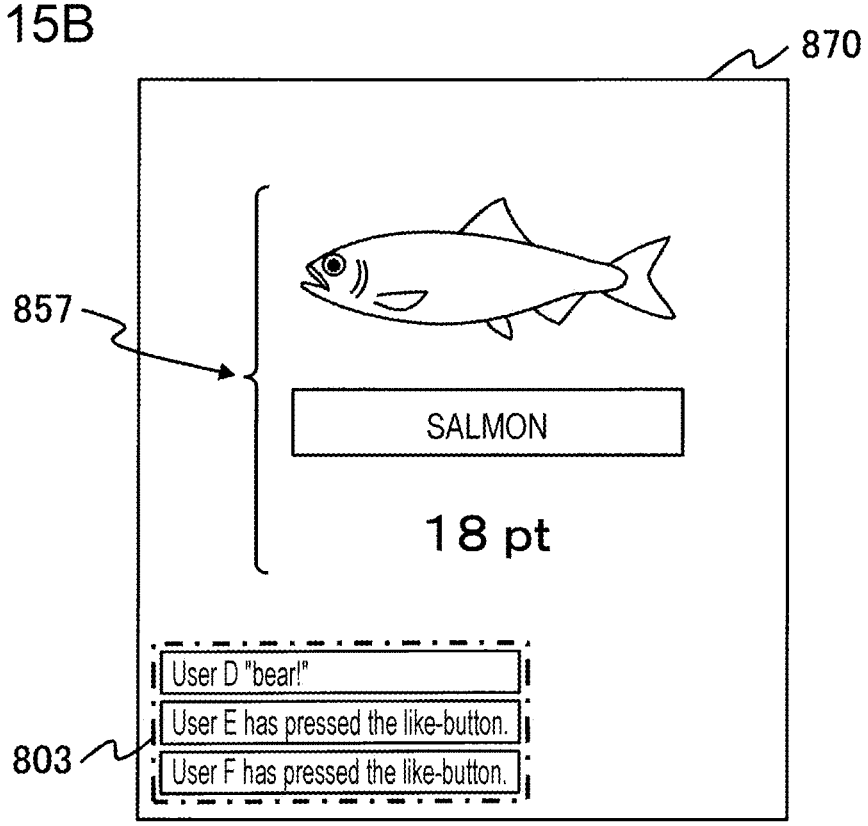

FIG. 15B is a view illustrating an example of the game result screen 870 displayed on the display unit 23 of the stream terminal 2a. The game result screen 870 includes an obtained game object 857 and the response information display area 803.

The obtained game object 857 is an image showing a game object in association with the stream user depending on success of the second game. The obtained game object 857 includes information showing an image, a name, or predetermined points. The executor 272 stores an object ID to identify the game object shown by the obtained game object 857, in the storage device 22 in association with the user ID of a stream user, thereby giving the game object shown by the obtained game object 857 to the stream user as a reward (benefit) for successfully played second game.

Upon a tap operation performed by a stream user on a predetermined display area in the game result screen 870, the input device 24 notifies the executor 272 of instructions for ending the game. The predetermined display area may also be, for instance, the entire display area of the game result screen 870, or may be a partial area of the game result screen 870 (for instance, a partial area of the entire display area of the game result screen 870 excluding the outer margin area).

When receiving instructions for ending the game from the input device 24, the executor 272 ends the display of the game result screen 870, and instructs the reproducer 275 to resume the display of the character stream screen 800. Note that when the display of the second game stream screen 850 ends, the executor 272 may instruct the reproducer 275 to resume the display of the character stream screen 800 without displaying the game result screen 870. In this case, display of the game result screen 870 may be performed according to instructions for game result display.

Figure 16A:
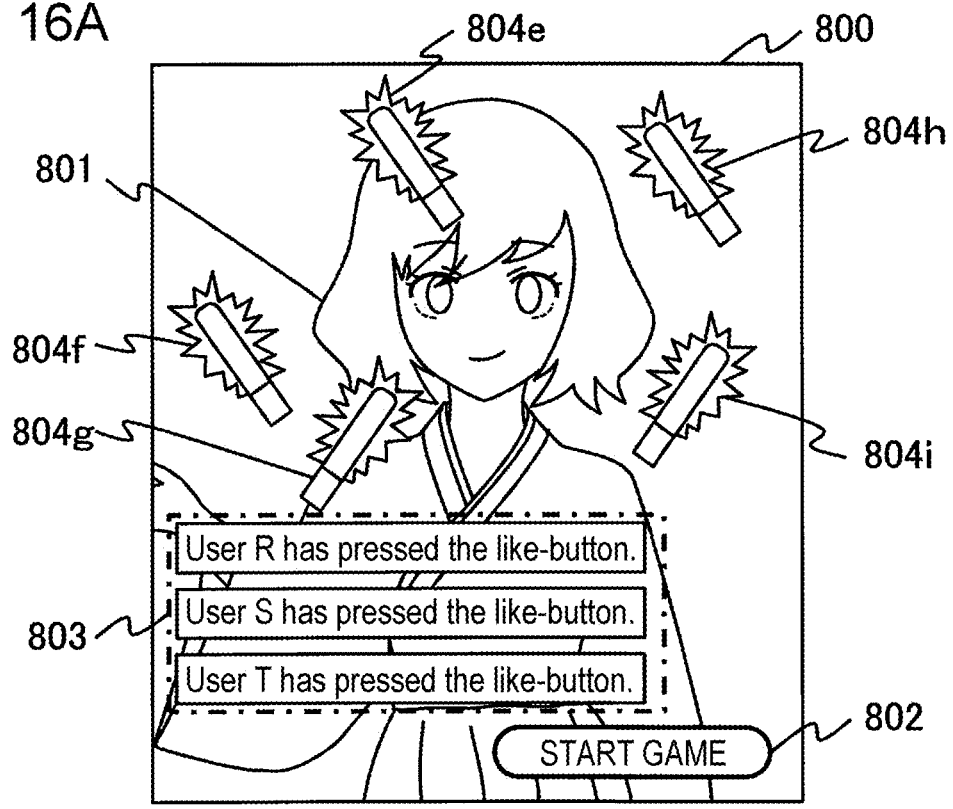
FIGS. 16A and 16B are each a view illustrating an example of a screen displayed on the display unit of the terminal.

FIG. 16A is a view illustrating an example of the character stream screen 800 which has resumed its display on the display unit 23 of the stream terminal 2a. In the same manner as the character stream screen 800 illustrated in FIG. 7A, the character stream screen 800 illustrated in FIG. 16A includes the character object 801, the game start button 802, and the response information display area 803. In addition, the character stream screen 800 illustrated in FIG. 16A includes gift objects 804e to 804i.

When receiving instructions for resuming display of the character stream screen 800 from the executor 272, the reproducer 275 counts the number of records of information on all or part of the effect instructions stored in the effect instruction history table T3. The reproducer 275 displays the counted number of specific gift objects in the character stream screen 800 simultaneously or sequentially. When the number of records of information on the effect instructions stored in the effect instruction history table T3 is five as in the example illustrated in FIG. 16A, the reproducer 275 sequentially displays the specific gift objects 804e to 804i corresponding to the five records of effect instructions.

When the specific gift objects are displayed, the reproducer 275 deletes from the effect instruction history table T3 the information corresponding to the effect instructions for the displayed specific gift objects among the information (viewing user ID, receive date/time, and points) corresponding to the effect instructions stored in the effect instruction history table T3. After the display of the specific gift objects corresponding to the information stored in the effect instruction history table T3, or during the display of the specific gift objects, the reproducer 275 performs display processing corresponding to request stream data including a display request from the viewing terminal 2b.

Figure 16B:
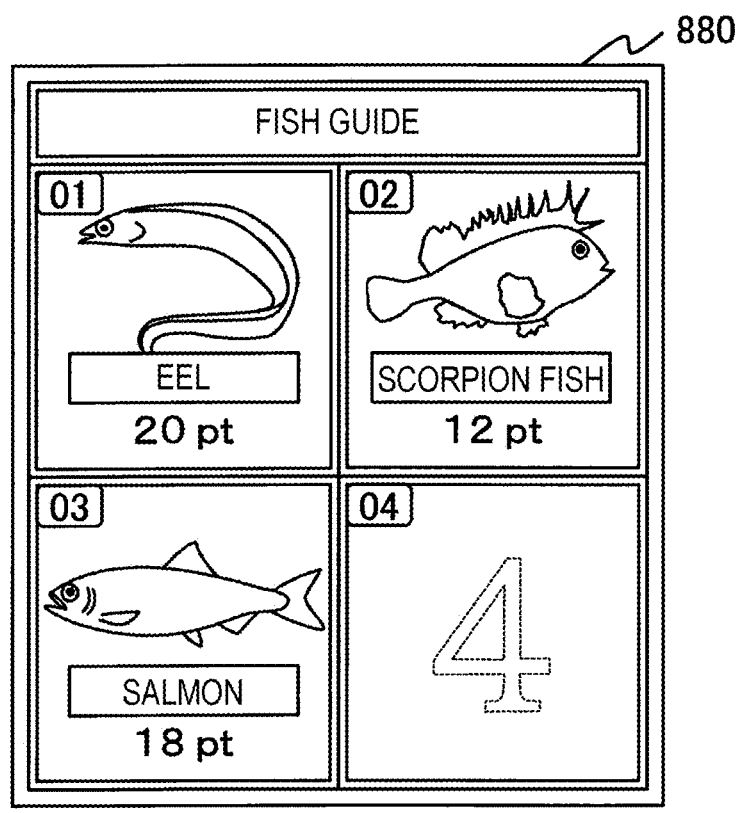

FIG. 16B is a view illustrating an example of a list screen 880 displayed on the display unit 23 of the stream terminal 2a. The reproducer 275 displays the list screen 880 on the display unit 23 in response to selection by a stream user from predetermined list screen buttons displayed on the display unit 23 of the stream terminal 2a. The list screen 880 displays information showing the images, names or predetermined points of the game objects given to the stream user each as a reward (benefit) for successfully played second game in the past.

(Operation Sequence of Video Stream System 1)

Figure 17:
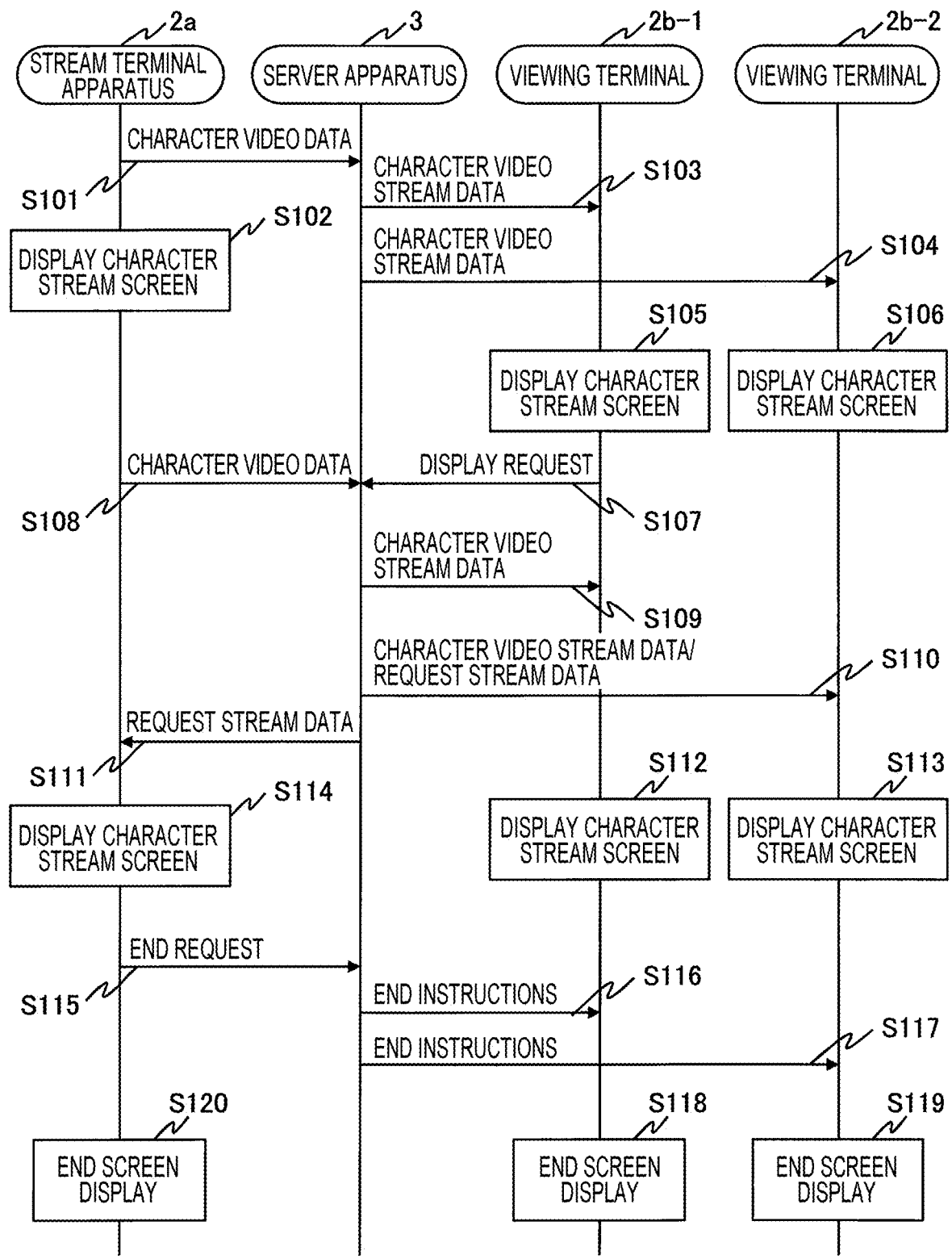
FIG. 17 is a diagram illustrating an example of an operation sequence of the video stream system.

FIG. 17 is a diagram illustrating an example of an operation sequence of the video stream system 1. The operation sequence is executed in cooperation with the components of the terminal 2 and the server apparatus 3 primarily by the processor 27 and the processor 33, based on the program pre-stored in the storage device 22 and the storage device 32. A description is given below under the assumption that a stream user Ua operates a stream terminal 2a, a viewing user Ub-1 operates a viewing terminal 2b-1, and a viewing user Ub-2 operates a viewing terminal 2b-2.

Note that the video sequence illustrated in FIG. 17 is executed from the start to the end of a stream event, and is not executed from the start to the end of a game.

First, the transmitter 273 of the stream terminal 2a transmits character video data to the server apparatus 3 via the communication I/F 21, the character video data including motion data generated by the generator 271 and the user ID of a stream user (step S101). The transmitter 273 may include the sound data of the stream user in the character video data. The processing in step S101 is continuously executed for every predetermined time interval (for instance, for every two second interval) until the stream event ends, thus the processing according to step S101 to S106 is intermittently performed.

The reproducer 275 of the stream terminal 2a generates drawing data to display a character stream screen based on the motion data (and sound data) generated by the generator 271, and displays the character stream screen on the display unit 23, based on the generated drawing data (step S102).

Subsequently, the server streamer 332 of the server apparatus 3 streams character video stream data including the character video data received from the stream terminal 2a to the viewing terminal 2b-1 and the viewing terminal 2b-2 via the communication I/F 31 (step S103 and S104).

The reproducer 275 of the viewing terminal 2b-1 generates drawing data to display a character stream screen based on the character video stream data received by the receiver 274, and displays a character stream screen on the display unit 23, based on the generated drawing data (step S105). Similarly, the reproducer 275 of the viewing terminal 2b-2 generates drawing data to display a character stream screen based on the character video stream data received by the receiver 274, and displays a character stream screen on the display unit 23, based on the generated drawing data (step S106).

Subsequently, the transmitter 273 of the viewing terminal 2b-1 transmits to the server apparatus 3 via the communication I/F 21 a display request to display response information on the stream screen, input by the viewing user Ub operating the input device 24, and/or a display request to display a gift object corresponding to gift object information on the stream screen (step S107).

In addition, the transmitter 273 of the stream terminal 2a continuously transmits character video data to the server apparatus 3 via the communication I/F 21, the character video data including motion data generated by the generator 271 and the user ID of the stream user (step S108). The transmitter 273 may include the sound data of the stream user in the character video data.

The server streamer 332 of the server apparatus 3 streams character video stream data to the viewing terminal 2b-1 via the communication I/F 31, the character video stream data including motion data and sound data (and a user ID) of the character video data received from the stream terminal 2a (step S109), streams character video stream data and request stream data to the viewing terminal 2b-2 via the communication I/F 31, the character video stream data including motion data and sound data (and a user ID) of the character video data received from the stream terminal 2a, the request stream data including a display request transmitted from the viewing terminal 2b-1 (step S110), and transmits request stream data including the display request transmitted from the viewing terminal 2b-1 to the stream terminal 2a (step S111).

Subsequently, the reproducer 275 of the viewing terminal 2b-1 generates drawing data to display a character stream screen, based on response information input by the viewing user Ub operating the input device 24 and the character video stream data received by the receiver 274, and displays a character stream screen on the display unit 23, based on the generated drawing data (step S112). The reproducer 275 of the viewing terminal 2b-2 generates drawing data to display a character stream screen based on the character video stream data and the request stream data received by the receiver 274, and displays a character stream screen on the display unit 23, based on the generated drawing data (step S113). Furthermore, the reproducer 275 of the stream terminal 2a generates drawing data to display a character stream screen based on the motion data (and sound data) generated by the generator 271 and the request stream data received by the receiver 274, and displays a character stream screen on the display unit 23, based on the generated drawing data (step S114).

The transmitter 273 of the stream terminal 2a transmits an end request for the stream event to the server apparatus 3 via the communication I/F 21, the end request being in response to an end operation performed by the stream user Ua on the input device 24 (step S115).

Subsequently, the server streamer 332 of the server apparatus 3 streams end instructions for reproducing the stream event to the viewing terminal 2b-1 and the viewing terminal 2b-2 via the communication I/F 31 (step S116 and S117).

Subsequently, the reproducer 275 of the viewing terminal 2b-1 ends reproduction of the character stream screen according to the end instructions received by the receiver 274 (step S118). The reproducer 275 of the viewing terminal 2b-2 ends the reproduction of the stream screen according to character end instructions received by the receiver 274 (step S119).

The reproducer 275 of the stream terminal 2a which has transmitted the end instructions ends the reproduction of the character stream screen (step S120).

Figure 18:
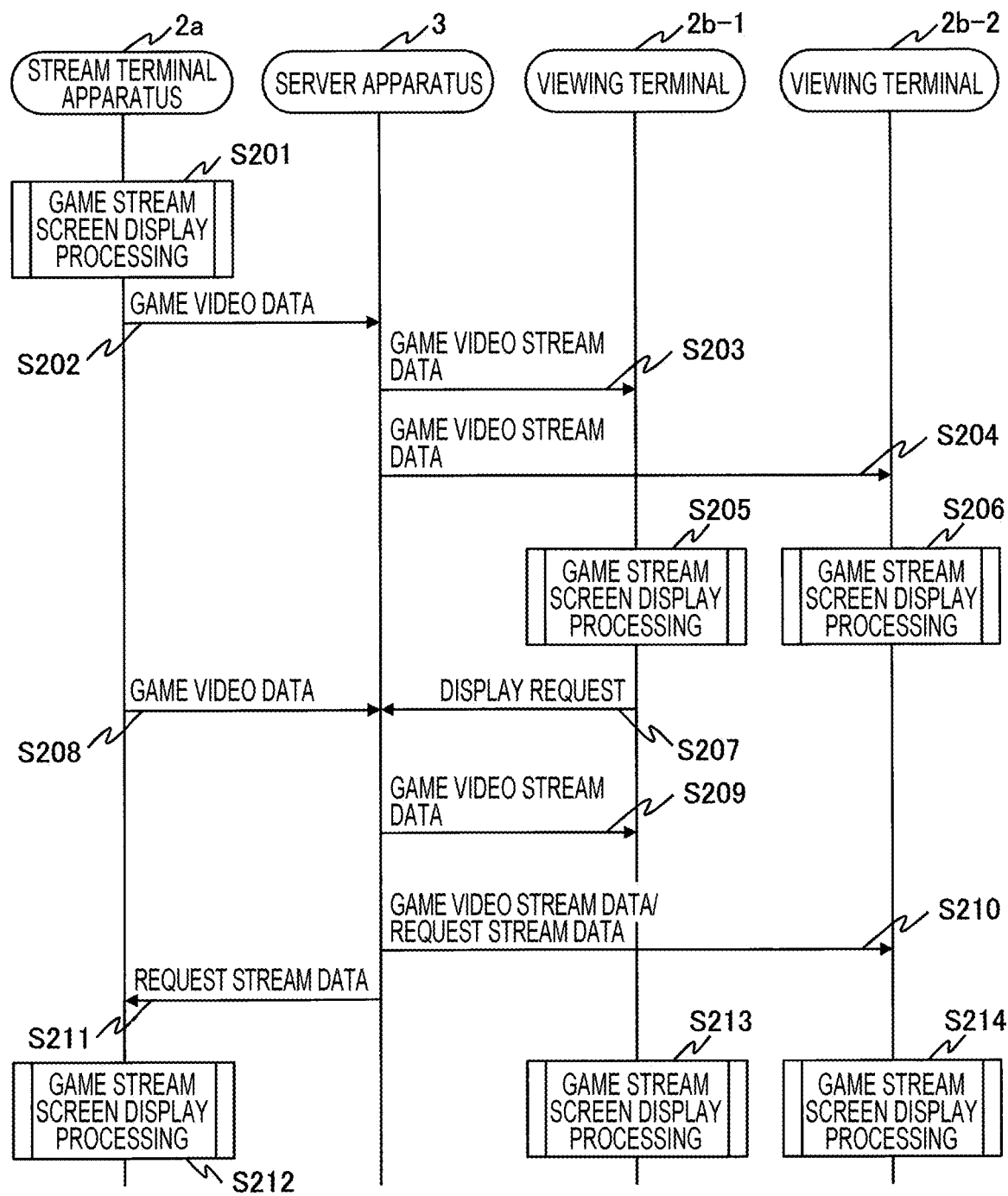
FIG. 18 is a diagram illustrating another example of an operation sequence of the video stream system.

FIG. 18 is a diagram illustrating another example of an operation sequence of the video stream system 1. The operation sequence is executed in cooperation with the components of the terminal 2 (the stream terminal 2a, the viewing terminal 2b-1 and the viewing terminal 2b-2) and the server apparatus 3 primarily by the processor 27 and the processor 33, based on the program pre-stored in the storage device 22 and the storage device 32. Note that the video sequence illustrated in FIG. 18 is executed from the start to the end of execution of a game.

First, the executor 272 of the stream terminal 2a performs game stream screen display processing (step S201). The game stream screen display processing will be described below. The processing in step S201 is continuously executed for every predetermined time interval (for instance, for every two second interval) until the stream event ends, thus the processing according to step S201 to S206 is intermittently performed.

Subsequently, the transmitter 273 of the stream terminal 2a transmits game video data to the server apparatus 3 via the communication I/F 21, the game video data including display data to display a video on the game screen of the game being executed, and the stream user ID stored in the storage device 22 (step S202). The transmitter 273 may include the sound data of the stream user in the game video data.

Subsequently, the server streamer 332 of the server apparatus 3 streams game video stream data to the viewing terminal 2b-1 and the viewing terminal 2b-2 via the communication I/F 31, the game video stream data being contained in the game video data received by the server receiver 331 and including a video on the game screen of the game being executed (step S203 and S204).

The reproducer 275 of the viewing terminal 2b-1 performs the game stream screen display processing based on the game video stream data received by the receiver 274 (step S205). Similarly, the reproducer 275 of the viewing terminal 2b-2 performs the game stream screen display processing based on the character video stream data received by the receiver 274 (step S206). The game stream screen display processing will be described below.

Subsequently, the transmitter 273 of the viewing terminal 2b-1 transmits to the server apparatus 3 via the communication I/F 21 a display request to display response information on the stream screen, input by the viewing user Ub operating the input device 24, and/or a display request to display a gift object corresponding to gift object information on the stream screen (step S207).

In addition, the transmitter 273 of the stream terminal 2a continuously transmits game video data to the server apparatus 3 via the communication I/F 21, the game video data including display data to display a video on the game screen of the game being executed, and the stream user ID stored in the storage device 22 (step S208). The transmitter 273 may include the sound data of the stream user in the character video data.

The server streamer 332 of the server apparatus 3 streams game video stream to the viewing terminal 2b-1 via the communication I/F 31, the game video stream data being contained in the game video data received from the stream terminal 2a and including a video on the game screen of the first game being executed, (step S209), streams request stream data to the viewing terminal 2b-2 via the communication I/F 31, the request stream data including the game video stream data being contained in the game video data received from the stream terminal 2a and including a video on the game screen of the first game being executed, and a display request transmitted from the viewing terminal 2b-1 (step S210), and transmits request stream data including the display request transmitted from the viewing terminal 2b-1 to the stream terminal 2a (step S211).

The executor 272 and the reproducer 275 of the stream terminal 2a perform the game stream screen display processing based on the request stream data received by the receiver 274 (step S212). In addition, the reproducer 275 of the viewing terminal 2b-1 performs the game stream screen display processing based on the response information input by the viewing user Ub operating the input device 24 and the game video stream data received by the receiver 274 (step S213). Furthermore, the reproducer 275 of the viewing terminal 2b-2 performs the game stream screen display processing based on the game video stream data and the request stream data received by the receiver 274 (step S214).

Figure 19:
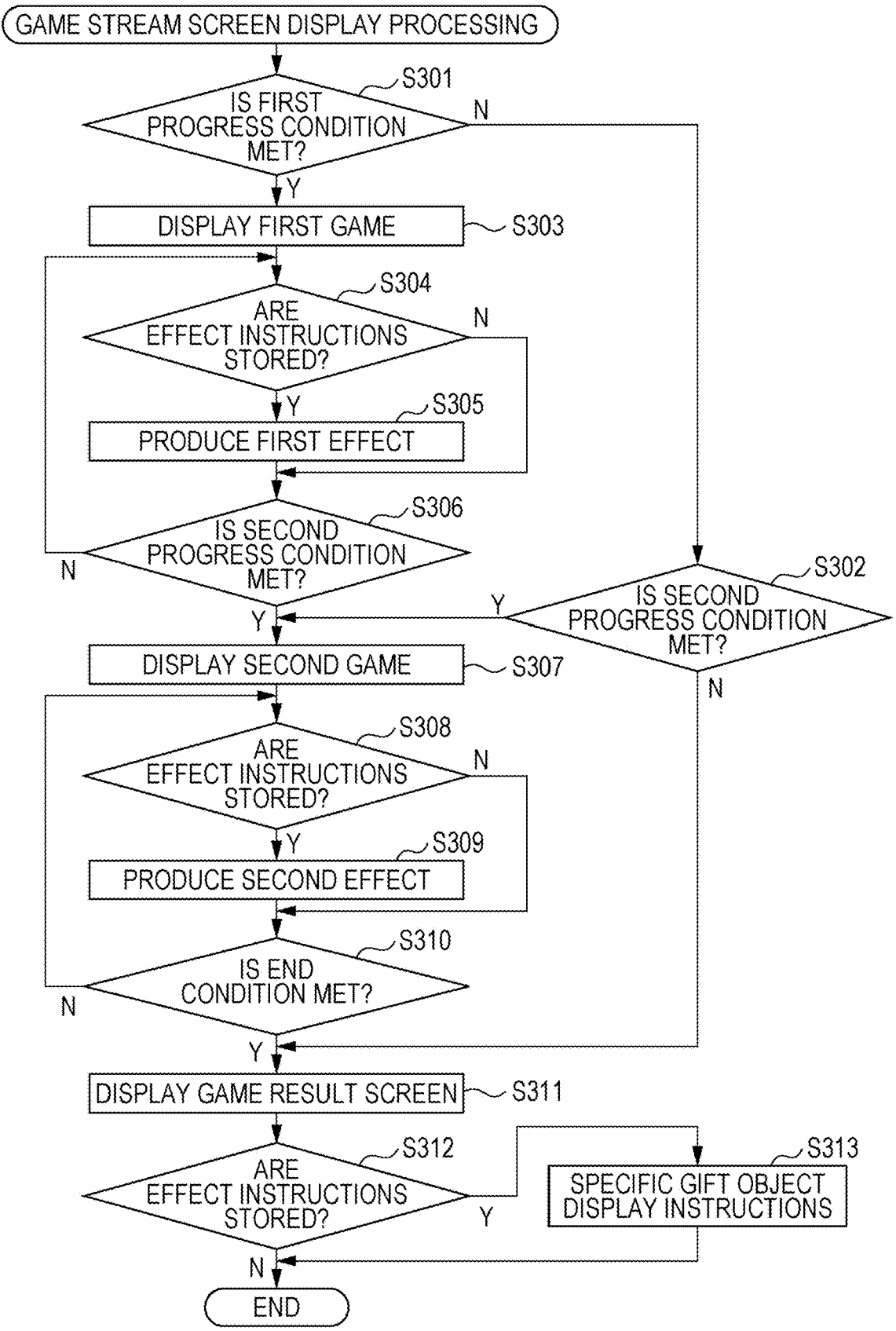
FIG. 19 is a chart illustrating an example of an operation flow of game stream screen display processing.

FIG. 19 is a chart illustrating an example of an operation flow of the game stream screen display processing performed by the executor 272 and the reproducer 275 of the terminal 2 (the stream terminal 2a and the viewing terminal 2b). The game stream screen display processing illustrated in FIG. 19 is performed in step S201, S205, S206, S212, S213 and S214 of FIG. 18.

At first, the executor 272 determines whether the first progress condition is met (step S301). The first progress condition is for progressing the first game, and is, for instance, that the input device 24 has received instructions for executing a game and the present time is within the first game period since the reception of the instructions for executing a game. The first game period in the first progress condition may start in each of the following situations: when a predetermined first game start time is reached, when the virtual monetary value possessed by a stream user is greater than or equal to a predetermined value, less than a predetermined value, or greater than or equal to a first predetermined value and less than a second predetermined value, and when the number of viewing terminals 2b which display a stream event is greater than or equal to a predetermined number, less than a predetermined number, or greater than or equal to a first predetermined number and less than a second predetermined number. The first game period may end when the stream user successfully plays the first game.

When determining that the first progress condition is not met (No in step S301), the executor 272 determines whether the second progress condition is met (step S302). The second progress condition is that at the present time, the first game period has elapsed since the reception of the instructions for executing a game from the input device 24 (after the first game has ended and the second game has started), and an end condition for the second game is not met. For instance, the end condition for the second game is that a viewing user has successfully played the second game. The end condition for the second game may be that the second game period has elapsed since the start of the second game.

When determining that the second progress condition is met (Yes in step S302), the executor 272 proceeds to step S307. The processing in step S307 will be described below.

When determining that the second progress condition is not met (No in step S302), the executor 272 proceeds to step S311. The processing in step S311 will be described below.

When determining that the first progress condition is met (Yes in step S301), the executor 272, or the executor 272 and the reproducer 275 display the first game (step S303). The executor 272 of the stream terminal 2a progresses the first game based on the various commands contained in the control program (game program) stored in the storage device 22 and a game operation input by the stream user, and displays a game stream screen including the screen of the first game in progress on the display unit 23. The reproducers 275 of the viewing terminal 2b-1 and the viewing terminal 2b-2 generate drawing data to display a game stream screen including a video on the screen of the first game based on the game video stream data received by the receiver 274, and displays a game stream screen on the display unit 23, based on the generated drawing data.

During the progress of the first game, the executor 272 determines whether information (viewing user ID, receive date/time, and points) on effect instructions is stored in the effect instruction history table T3 (step S304).

When determining that information on effect instructions is not stored in the effect instruction history table T3 (No in step S304), the executor 272 proceeds to step S306.

When determining that information on effect instructions is stored in the effect instruction history table T3 (Yes in step S304), the executor 272 retrieves information (viewing user ID, receive date/time, and points) on the oldest effect instructions stored in the effect instruction history table T3 for every predetermined time interval (for instance, for every one second), and produces the first game effect corresponding to the retrieved effect instructions (step S305).

Subsequently, the executor 272 determines whether the second progress condition is met (step S306).

When determining that the second progress condition is not met (No in step S306), the executor 272 returns the processing to step S304.

When determining that the second progress condition is met (Yes in step S306), the executor 272, or the executor 272 and the reproducer 275 display the second game (step S307).

The executor 272 of the stream terminal 2a progresses the second game based on the various commands contained in the control program (game program) stored in the storage device 22 and a game operation input by the stream user and displays a game stream screen including the screen of the second game in progress on the display unit 23. The reproducers 275 of the viewing terminal 2b-1 and the viewing terminal 2b-2 generate drawing data to display a game stream screen including a video on the screen of the second game based on the game video stream data received by the receiver 274, and displays a game stream screen on the display unit 23, based on the generated drawing data.

During the progress of the second game, the executor 272 determines whether information (viewing user ID, receive date/time, and points) on effect instructions is stored in the effect instruction history table T3 (step S308).

When determining that information on effect instructions is not stored in the effect instruction history table T3 (No in step S308), the executor 272 proceeds to step S310.

When determining that information on effect instructions is stored in the effect instruction history table T3 (Yes in step S308), the executor 272 retrieves information (viewing user ID, receive date/time, and points) on the oldest effect instructions stored in the effect instruction history table T3 for every predetermined time interval (for instance, for every one second), and produces the second game effect corresponding to the retrieved effect instructions (step S309).

Subsequently, the executor 272 determines whether the end condition for the second game is met (step S310).

When determining that the end condition for the second game is not met (No in step S310), the executor 272 returns the processing to step S308.

When determining that the end condition for the second game is met (Yes in step S310), the executor 272, or the executor 272 and the reproducer 275 display a game result screen on the display unit 23 (step S311). The executor 272 of the stream terminal 2a ends the second game based on various commands contained in the control program (game program) stored in the storage device 22, and displays a game result screen on the display unit 23, the game result screen including obtained game objects given to the stream user. The reproducers 275 of the viewing terminal 2b-1 and the viewing terminal 2b-2 generate drawing data to display a game result screen including obtained game objects given to the stream user, based on the game video stream data received by the receiver 274, and displays a game result screen on the display unit 23, based on the generated drawing data.

Subsequently, each reproducer 275 determines whether information (viewing user ID, receive date/time, and points) on effect instructions is stored in the effect instruction history table T3 (step S312).

When determining that information on effect instructions is not stored in the effect instruction history table T3 (No in step S312), the reproducer 275 ends the game stream screen display processing.

When determining that information on effect instructions is stored in the effect instruction history table T3 (Yes in step S312), the reproducer 275 counts the number of records of information on all stored effect instructions, notifies the reproducer 275 of instructions for displaying the counted number of specific gift objects in the character stream screen 800 (step S313), and ends the game stream screen display processing.

Note that in the processing procedure illustrated in FIGS. 17 to 19, it is possible to omit part of the processes (steps) included in the processing procedure, add a process to the processes included in the processing procedure and/or change the order of the processes. As long as not departing from the spirit of the present disclosure, the processing procedure which has undergone such omission, addition, or change is also included in the scope of the present disclosure.

As described in detail above, in the video stream system 1 of the embodiment, even when the same effect instructions are input by a viewing user, an event effect according to a stream screen being displayed and/or video stream data being transmitted is produced. Specifically, the selection screen 820 can be displayed by selecting any of the gift button 812 included in the character stream screen 810 (FIG. 7B, FIG. 9A), the gift button 812 included in the first game stream screen 840 (FIG. 10B, FIG. 11B, FIG. 12B), and the gift button 812 included in the second game stream screen 860 (FIG. 13B, FIG. 14B) by a viewing user. When a gift object corresponding to a candidate object in the displayed selection screen 820 is a specific gift object, in each of the character stream screen 810 being displayed, the first game stream screen 840 being displayed, and the second game stream screen 860 being displayed, the video stream system 1 can produce event effects different from each other. In this manner, the video stream system 1 of the embodiment makes it possible to improve the game performance of each game stream screen, and enhance the sense of togetherness between the stream user and the viewing users for each stream event without using respective user interfaces for the stream screen being displayed and/or the video stream data being transmitted (without making the user interface complicated). In addition, in the video stream system 1, it is not necessary to install user interfaces to produce different event effects for each type of the stream screen being displayed, and to perform screen display processing to implement each of the user interfaces, thus delay of information processing due to a processing load of the terminal 2 can be prevented in advance. In addition, in the video stream system 1, each viewing user has only to input the same effect instructions to produce different event effects for each type of the stream screen being displayed. Thus, in the communication method of video stream system 1, as compared with when different instruction requests are transmitted for each type of the stream screen during display, the load of communication network can be further reduced.

(Modification 1)

Note that the present disclosure is not limited to the embodiment. For instance, the game provided by the video stream system 1 of the embodiment is not limited to a fishing game, and sports games other than the fishing game may be provided.

When the game provided by the video stream system 1 is a golf game, for instance, the first game provides a game during a period in which the ball is hit from the teeing ground and lands on the green, and the second game provides a game on the green. In this case, upon a tap operation performed by a stream user on a predetermined display area in the first game stream screen 840 and the second game stream screen 850, the input device 24 notifies the executor 272 of game input instructions. When receiving the game input instructions from the input device 24, the executor 272 displays a ball object to be moved by a shot or a putt. The second game starts when the ball object lands on the green, and ends when the ball enters the cup with the second game successfully played.

In this case, the first game effect is at least of the following types of effects: the effect of extending the flying distance of the ball object, the effect of changing the flying direction of the ball to a direction toward the green, and the effect of changing (decreasing or increasing) the number of shots of the ball object. The second game effect is at least one of the following types of effects: the effect of increasing the flying distance of the ball object when the flying distance is shorter than the distance to the cup, the effect of decreasing the flying distance of the ball object when the flying distance is longer than the distance to the cup, the effect of change the flying direction of the ball to a direction toward the cup, and the effect of changing (decreasing or increasing) the number of shots of the ball object.

A game provided by the video stream system 1 may have multiple game stages. In this case, the first game is the one on a specific game stage between the multiple game stages, and the second game is the one on the game stage immediately after the game stage of the first game.

In this case, the first game effect is at least one of the following types of effects: the effect of changing (extending or reducing) the first game period, the effect of changing (decreasing or increasing) the points earned by the stream user in the first game, and the effect of changing (for instance, changing (decreasing or increasing) the parameter value of a game medium and/or replacing an earned game medium with another game medium) a game medium earned by the stream user in the first game. The second game effect is at least one of the following types of effects: the effect of changing (extending or reducing) the second game period, the effect of changing (decreasing or increasing) the points earned by the stream user in the second game, and the effect of changing (for instance, changing (decreasing or increasing) the parameter value of a game medium and/or replacing an earned game medium with another game medium) a game medium earned by the stream user in the second game.
(Modification 2)

The effect instructions according to the information to be stored as a new record in the effect instruction history table T3 are not limited to display request for one type of a specific gift object, and may be display request for multiple types of specific gift objects. In this case, during the progress of the first game, the reproducer 275 retrieves information (viewing user ID, receive date/time, and points) on the oldest effect instructions stored in the effect instruction history table T3 for every predetermined time interval (for instance, for every one second), retrieves the model ID of a character object in association with the retrieved viewing user ID from the user table T1, and generates the character object 833a based on model data in association with the retrieved model ID. The reproducer 275 retrieves the transportation object 833b corresponding to the retrieved point from the storage device 22. The reproducer 275 then displays the generated character object 833a and the retrieved transportation object 833b on the first game stream screens 830 and 840. In this case, each of multiple types of transportation objects 833b has a display color which is different from those of other transportation objects 833. In this manner, the display color of the displayed transportation object 833 is changed in response to the points of a specific gift object given to the stream user by a viewing user.

Similarly, the body object of the character object 855 displayed by the reproducer 275 during the progress of the second game may have a display color corresponding to the points of information on the effect instructions according to the character object 855.
(Modification 3)

The total value of points in association with all types of specific gift objects given to the stream user by viewing users may be stored in the storage device 22 of the terminal 2 and/or the storage device 32 of the server apparatus 3. The reproducer 275 of each terminal 2 may display the ranking of the stream users, based on the total value of the stored points.
(Modification 4)

In the list screen 880 illustrated in FIG. 16B, the image of each game object given to the stream user may include the character object of a viewing user who has made a display request (in other words, "effect instructions") for a specific gift object in the game period of the game (the first game and the second game) played when the game object is given. Thus, the game object given as an earned object as well as the character object of a viewing user in cooperation with the game can be placed in one image, thus commitment of each viewing user to participate in a stream event can be improved.

When a display request transmitted from the viewing terminal 2b during the display of the game stream screen is for a gift object other than the specific gift objects, the receiver 274 may store information on the gift object according to the display request in the storage device 22 as a non-display gift object. When the game ends, and the display of the character stream screen resumes, the non-display gift objects stored in the storage device 22 may be displayed in the character stream screen simultaneously or sequentially.
(Modification 5)

At least part of the function implemented by the processor 27 of the terminal 2 may be implemented by a processor other than the processor 27 of the terminal 2. At least part of the function implemented by the processor 27 may be implemented, for instance, by the processor 33 of the server apparatus 3. Specifically, part of the function (function of generating a character object animation and/or function of generating a stream screen) of the reproducer 274 may be performed in the server apparatus 3. For instance, character video stream data to display a character stream screen generated in the stream terminal 2a is transmitted to each viewing terminal 2b, and each viewing terminal 2b may display the character stream screen based on the received character video stream data. The transmitter 272 of the stream terminal 2a may transmit the video data of a character stream screen to the viewing terminal 2b via the server apparatus 3, the character stream screen being displayed based on the drawing data generated by the reproducer 274 of the stream terminal 2a. Consequently, the viewing terminal 2b of a viewing user can display the same stream screen as that displayed on the stream terminal 2a only by obtaining the video data. For instance, in the operation sequence illustrated in FIG. 17, the reproducer 274 of the stream terminal 2a performs step S102 without performing step S101, S103 and S104. Next, the transmitter 272 of the stream terminal 2a transmits the video data of the character stream screen displayed in step S102, and the server streamer 332 of the server apparatus 3 streams the video data received from the stream terminal 2a to the viewing terminals 2b-1 and 2b-2 via the communication I/F 31. In addition, step S108 to S110 are not performed, and the transmitter 272 of the stream terminal 2a transmits the character video data of the stream screen displayed in step S114, and the server streamer 332 of the server apparatus 3 streams character video stream data including the character video data received from the stream terminal 2a to the viewing terminals 2b-1 and 2b-2 via the communication I/F 31.
(Modification 6)

The stream screen displayed on the stream terminal 2a and the stream screen displayed on the viewing terminal 2b may be the same screen.

What is claimed is:

1. A terminal, comprising:
a memory;
a display; and
processing circuitry configured to execute instructions stored in the memory to:
control the display to display a character animation including a first character object that represents a first user;
transmit, to a second user terminal of at least one second user different from the first user, information to display the character animation;
control the display to display a screen of a game played by the first user;
transmit, to the second user terminal, information for displaying a video outside of a display period of the character animation, the video including the screen of the game; and
generate, in a case that a command from the second user terminal is acquired, an effect corresponding to a video being displayed, the effect including a first effect or a second effect.

2. The terminal according to claim 1, wherein
the first effect corresponds the character animation, and
the second effect corresponds to the video.

3. The terminal according to claim 1, wherein
the processing circuitry is further configured to control the display to display the screen of the game upon completion of display of the character animation, and
in a case that the command from the second user terminal is issued while the character animation is being displayed,
the processing circuitry generates the second effect corresponding to the video, and
in response to activation of the command, the processing circuitry controls the display to display the second effect corresponding to the video.

4. The terminal according to claim 1, wherein the processing circuitry is further configured to
generate the first effect corresponding to the character animation, the first effect being to display a first object together with the character animation, and
display a second object on the screen of the game and generate the second effect corresponding to the second object.

5. The terminal according to claim 4, wherein the first object, which is displayed together with the character animation, is a gift object corresponding to the command from the second user terminal of the at least one viewer user.

6. The terminal according to claim 4, wherein the processing circuitry is further configured to, in a case that the game ends,
control the display to start to display the character animation upon completion of display of the screen of the game, and
display, for commands issued during execution of the game, the first object corresponding to each command once display of the character animation has started.

7. The terminal according to claim 1, wherein a second character animation including a second character object is displayed on the screen of the game, the second character animation representing the at least one second user of the second user terminal that issued the command.

8. A control method for a terminal device, the control method comprising:
displaying, by a display of the terminal device, a character animation including a first character object that represents a first user;
transmitting, to a second user terminal of at least one viewer user different from the first user, information to display the character animation;
displaying, by the display, a screen of a game played by the first user;
transmitting, to the second user terminal, information for displaying a video outside of a display period of the character animation, the video including the screen of the game; and
generating, by processing circuitry of the terminal device in a case that a command from the second user terminal is acquired, an effect corresponding to a video being displayed, the effect including a first effect or a second effect.

9. The control method according to claim 8, further comprising:
generating, in a case that the effect is generated while the character animation is being displayed, the effect including the first effect of the character animation, and
generating, in a case that the effect is generated while the video is being displayed, the effect including the second effect of the video.

10. The control method according to claim 8, further comprising:
displaying the screen of the game upon completion of display of the first effect of the character animation;
generating the second effect corresponding to the video in a case that the command from the second user terminal is issued while the character animation is being displayed; and
transitioning from display of the first effect to the second effect, the transitioning occurring during a period of time corresponding to a time delay between when the command is sent and the second effect is generated.

11. The control method according to claim 8, further comprising:
generating the first effect corresponding to the character animation, the first effect being to display a first object together with the character animation; and
displaying a second object on the screen of the game and generating the second effect corresponding to the second object.

12. The control method according to claim 11, wherein the first object, which is displayed together with the character animation, is a gift object corresponding to the command from the second user terminal of the at least one viewer user.

13. The control method according to claim 11, further comprising, in a case that the game ends:
displaying the character animation upon completion of display of the screen of the game; and
displaying, for commands issued during execution of the game, the first object corresponding to each command once display of the character animation has started.

14. The control method according to claim 8, wherein a second character animation including a second character object is displayed on the screen of the game, the second character animation representing the at least one second user of the second user terminal that issued the command.

15. A server apparatus, comprising:
a memory; and
processing circuitry configured to execute instructions stored in the memory to:

receive, from a terminal device of a first user, information for displaying a character animation including a first character object that represents the first user;

transmit, to a second user terminal of at least one viewer user different from the first user, the information to display the character animation;

receive, from the terminal device, information for displaying a screen of a game, played by the first user, outside a display period of the character animation;

transmit, to the second user terminal, the information for displaying a video outside of the display period of the character animation, the video including the screen of the game; and in a case that a command from the second user terminal is acquired, control the terminal device to generate an effect including a first effect of the character animation or a second effect of the video.

16. A system, comprising:

a first terminal device of a first user;

a second terminal device of at least one viewer user different from the first user; and a server apparatus which communicates with the first terminal device and at least one of the second terminal device, wherein the first terminal device includes first processing circuitry configured to control a display to display a character animation including a first character object that represents the first user;

transmit, to the server apparatus, information for displaying the character animation;

control the display to display a screen of a game played by the first user; and transmit, to the server apparatus, information for displaying a video outside of a display period of the character animation, the video including the screen of the game, the second terminal device includes second processing circuitry configured to transmit a command to generate an effect to the server apparatus, the server apparatus includes third processing circuitry configured to transmit, to the second terminal device, the information for displaying the character animation and the information for displaying the video outside the display period of the character animation, and transmit the command to generate the effect to the first terminal device, and the first processing circuitry is further configured to generate, in a case that the command is received, the effect which includes a first effect of the character animation or a second effect of the video.

* * * * *